United States Patent
Park et al.

(10) Patent No.: US 12,147,516 B2
(45) Date of Patent: Nov. 19, 2024

(54) ANTI-SPOOFING METHOD AND APPARATUS

(71) Applicant: Samsung Electronics Co., Ltd., Suwon-si (KR)

(72) Inventors: Sungun Park, Suwon-si (KR); Kyuhong Kim, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 17/668,618

(22) Filed: Feb. 10, 2022

(65) Prior Publication Data
US 2022/0318354 A1 Oct. 6, 2022

(30) Foreign Application Priority Data

Mar. 31, 2021 (KR) .................. 10-2021-0042081
Jun. 15, 2021 (KR) .................. 10-2021-0077373

(51) Int. Cl.
*G06F 21/32* (2013.01)
*G06V 10/74* (2022.01)
(Continued)

(52) U.S. Cl.
CPC ............ *G06F 21/32* (2013.01); *G06V 10/761* (2022.01); *G06V 10/82* (2022.01);
(Continued)

(58) Field of Classification Search
CPC .............. G06F 21/32; G06F 18/214; G06F 2207/4824; G06F 7/02; G06F 18/00;
(Continued)

(56) References Cited

U.S. PATENT DOCUMENTS 10,698,998 B1   6/2020  Moore et al.
2014/0294262 A1*  10/2014  Schuckers .......... G06V 40/1388
                                                    382/125
(Continued)

FOREIGN PATENT DOCUMENTS

KR   10-2010-0073191 A   7/2010
KR        10-1255555 B1  4/2013
(Continued)

OTHER PUBLICATIONS

Cavalcanti, George D.C., et al., "MLPboost: A Combined ADAboost/Multi-Layer Perceptron Network Approach for Face Detection", 2012 IEEE International Conference on Systems, Man, and Cybernetics (SMC). IEEE, 2012, (4 pages in English).
(Continued)

*Primary Examiner* — Djenane M Bayard
(74) *Attorney, Agent, or Firm* — NSIP Law

(57) ABSTRACT

An anti-spoofing method includes detecting first information related to whether the biometric information is forged, based on a first output vector of a first neural network configured to detect whether the biometric information is forged from the input data, extracting an input embedding vector including a feature of biometric information of a user from input data including the biometric information, calculating a similarity value of the input embedding vector based on a fake embedding vector and either one or both of a real embedding vector and an enrollment embedding vector that are provided in advance, calculating a total forgery score based on the similarity value and a second output vector of the first neural network according to whether the first information is detected, and detecting second information related to whether the biometric information is forged, based on the total forgery score.

26 Claims, 17 Drawing Sheets

(51) Int. Cl.
*G06V 10/82* (2022.01)
*G06V 40/12* (2022.01)
*G06V 40/40* (2022.01)
*G06V 40/50* (2022.01)

(52) U.S. Cl.
CPC ...... *G06V 40/1365* (2022.01); *G06V 40/1388* (2022.01); *G06V 40/45* (2022.01); *G06V 40/50* (2022.01)

(58) Field of Classification Search
CPC ...... G06F 3/017; G06F 1/163; G06F 2218/10; G06F 21/31; G06F 18/217; G06F 18/251; G06F 18/2411; G06F 18/25; G06F 18/256; G06F 21/577; G06F 7/5443; G06F 18/22; G06F 18/253; G06F 21/316; G06F 21/44; G06F 17/16; G06F 21/554; G06F 2221/031; G06F 2221/2111; G06F 2221/2115; G06F 16/56; G06F 18/213; G06F 18/2415; G06F 2221/2105; G06F 3/167; G06F 9/451; G06F 17/142; G06F 18/2321; G06F 18/24; G06F 18/2413; G06F 21/46; G06F 21/55; G06F 21/566; G06F 21/604; G06F 21/6227; G06F 21/64; G06F 21/72; G06F 2218/12; G06F 2218/14; G06F 2221/034; G06F 16/951; G06F 40/289; G06F 40/295; G06F 40/30; G06F 21/34; G06F 40/20; G06F 40/279; G06F 18/211; G06F 18/2111; G06F 18/24323; G06F 18/285; G06F 2221/2107; G06F 40/216; G06F 40/35; G06F 16/55; G06F 18/2135; G06F 18/2148; G06F 18/24133; G06F 18/2433; G06F 21/552; G06F 21/73; G06F 2221/2133; G06F 8/443; G06F 8/73; G06F 8/751
See application file for complete search history.

(56) References Cited

U.S. PATENT DOCUMENTS

| | | | |
|---|---|---|---|
| 2017/0004352 A1* | 1/2017 | Jonsson | G06V 40/1376 |
| 2021/0209336 A1* | 7/2021 | Jonsson | G06V 10/764 |
| 2021/0279441 A1 | 9/2021 | Park et al. | |
| 2022/0070207 A1* | 3/2022 | Simonchik | G10L 15/16 |

FOREIGN PATENT DOCUMENTS

| | | |
|---|---|---|
| KR | 10-2018-0022677 A | 3/2018 |
| KR | 10-1912433 B1 | 12/2018 |
| KR | 10-2019-0072314 A | 6/2019 |
| KR | 10-2146089 B1 | 8/2020 |
| WO | WO 2015/001544 A2 | 1/2015 |
| WO | WO 2018/192672 A1 | 10/2018 |

OTHER PUBLICATIONS

Teplyakov, L. M., et al., "Training of Neural Network-Based Cascade Classifiers", Journal of Communications Technology and Electronics 64.8 (2019): 846-853.

Yuan, Chengsheng, et al., "Semi-supervised stacked autoencoder-based deep hierarchical semantic feature for real-time fingerprint liveness detection", Journal of Real-Time Image Processing 17.1 (2020): 55-71.

Extended European search report issued on Sep. 2, 2022, in counterpart European Patent Application No. 22162557.7 (11 pages in English).

* cited by examiner

ANTI-SPOOFING METHOD AND APPARATUS

CROSS-REFERENCE TO RELATED APPLICATIONS

This application claims the benefit under 35 USC § 119(a) of Korean Patent Application No. 10-2021-0042081 filed on Mar. 31, 2021, and Korean Patent Application No. 10-2021-0077373 filed on Jun. 15, 2021, in the Korean Intellectual Property Office, the entire disclosures of which are incorporated herein by reference for all purposes.

BACKGROUND

1. Field

The following description relates to a method and apparatus with anti-spoofing, and more particularly, to a method of detecting whether biometric information is forged.

2. Description of Related Art

Due to the development of smartphones and various mobile and wearable devices, the importance of technology for security authentication of biometric information is increasing. For example, among such forms of technology, fingerprint recognition technology is widely used due to a high level of convenience, security, and economic feasibility. In general fingerprint recognition, user authentication or verification may be performed by obtaining a fingerprint image of a user through a sensor and comparing the obtained fingerprint image to a pre-enrolled fingerprint image. When a finely fabricated fake fingerprint pattern is input to the sensor, a fingerprint recognizing device may not distinguish the fake fingerprint pattern from a genuine fingerprint pattern. Thus, the fingerprint recognizing device may improperly recognize the fake fingerprint pattern as a biometric fingerprint. For example, when a material such as rubber, silicone, gelatin, epoxy, and latex on which a fingerprint pattern is engraved makes a contact with the sensor, the fingerprint engraved on such a material may be recognized as a human fingerprint. In terms of security of biometric information, distinguishing spoof biometric information from live biometric information may be important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an anti-spoofing method includes detecting first information related to whether biometric information of a user is forged, based on a first output vector of a first neural network configured to detect whether the biometric information is forged from input data including the biometric information, extracting an input embedding vector including a feature of the biometric information from the input data, calculating a similarity value of the input embedding vector based on a fake embedding vector and either one or both of a real embedding vector and an enrollment embedding vector, the real embedding vector and the enrollment embedding vector being provided in advance, calculating a total forgery score based on the similarity value and a second output vector of the first neural network according to whether the first information is detected, and detecting second information related to whether the biometric information is forged, based on the total forgery score.

The detecting of the first information may include extracting the first output vector from an intermediate layer of the first neural network, and calculating an intermediate forgery score based on the first output vector.

The detecting of the first information may include determining whether the intermediate forgery score is in a threshold range for detection of the first information, and detecting the first information based on the intermediate forgery score, in response to determining that the intermediate forgery score is in the threshold range.

The calculating of the total forgery score may include, in response to the first information not being detected, calculating the total forgery score based on the second output vector and the similarity value.

The calculating of the total forgery score may include in response to the first information not being detected, calculating a final forgery score based on the second output vector, which is output from an output layer of the first neural network, and calculating the total forgery score based on the final forgery score and the similarity value.

The calculating of the total forgery score may include performing a weighted summation of the final forgery score and the similarity value, and calculating the total forgery score by applying a nonlinear function to a result of the weighted summation.

The detecting of the second information may include detecting the second information by comparing the total forgery score to a first threshold for detection of the second information.

The method may further include determining whether an embedding vector update condition of the input embedding vector is satisfied based on the total forgery score, and updating any one or any combination of the enrollment embedding vector, the real embedding vector, and the fake embedding vector, using the input embedding vector based on a determination that the embedding vector update condition is satisfied.

The method may further include generating a virtual enrollment embedding vector having an environmental characteristic different from an environmental characteristic of the enrollment embedding vector and having a structural characteristic of the enrollment embedding vector. The calculating of the similarity value may include calculating the similarity value based on the fake embedding vector and any one or any combination of the enrollment embedding vector, the real embedding vector, and the virtual enrollment embedding vector.

The similarity value may be calculated based on a posterior probability between the input embedding vector and any one or any combination of the real embedding vector, the enrollment embedding vector, and the fake embedding vector. The posterior probability may be calculated based on a distance or a similarity between the input embedding vector and the any one or any combination of the real embedding vector, the enrollment embedding vector, and the fake embedding vector.

The calculating of the similarity value may include determining a value of a first category corresponding to a case in which the biometric information is not forged, based on a first distance between the real embedding vector and the input embedding vector and a third distance between the enrollment embedding vector and the input embedding vector, determining a value of a second category corresponding to a case in which the biometric information is forged, based on a second distance between the fake embedding vector and the input embedding vector, and determining a confidence value of the input embedding vector based on the value of the first category and the value of the second category.

The extracting of the input embedding vector may include extracting the input embedding vector from the biometric information using the first neural network. The first neural network may be trained based on live biometric information and spoof biometric information.

In another general aspect, an anti-spoofing apparatus includes a processor configured to detect first information related to whether biometric information of a user is forged, based on a first output vector of a first neural network configured to detect whether the biometric information is forged from input data including the biometric information, to extract an input embedding vector including a feature of the biometric information from the input data, to calculate a similarity value of the input embedding vector based on a fake embedding vector and either one or both of a real embedding vector and an enrollment embedding vector, the real embedding vector and the enrollment embedding vector being provided in advance, to calculate a total forgery score based on the similarity value and a second output vector of the first neural network according to whether the first information is detected, and to detect second information related to whether the biometric information is forged, based on the total forgery score.

The processor may be configured to extract the first output vector from an intermediate layer of the first neural network, and calculate an intermediate forgery score based on the first output vector.

The processor may be configured to determine whether the intermediate forgery score is in a threshold range for detection of the first information, and to detect the first information based on the intermediate forgery score, in response to determining that the intermediate forgery score is in the threshold range.

The processor may be configured to, in response to the first information not being detected, calculate the total forgery score based on the second output vector and the similarity value.

The processor may be configured to, in response to the first information not being detected, calculate a final forgery score based on the second output vector, which is output from an output layer of the first neural network, and to calculate the total forgery score based on the final forgery score and the similarity value.

The processor may be configured to perform a weighted summation of the final forgery score and the similarity value, and to calculate the total forgery score by applying a nonlinear function to a result of the weighted summation.

The processor may be configured to detect the second information by comparing the total forgery score to a first threshold for detection of the second information.

The processor may be configured to determine whether an embedding vector update condition of the input embedding vector is satisfied based on the total forgery score, and to update any one or any combination of the enrollment embedding vector, the real embedding vector, and the fake embedding vector, using the input embedding vector based on a determination that the embedding vector update condition is satisfied.

The processor may be configured to generate a virtual enrollment embedding vector having an environmental characteristic different from an environmental characteristic of the enrollment embedding vector and having a structural characteristic of the enrollment embedding vector, and to calculate the similarity value based on the fake embedding vector and any one or any combination of the enrollment embedding vector, the real embedding vector, and the virtual enrollment embedding vector.

The similarity value may be calculated based on a posterior probability between the input embedding vector and any one or any combination of the real embedding vector, the enrollment embedding vector, and the fake embedding vector. The posterior probability may be calculated based on a distance or a similarity between the input embedding vector and the any one or any combination of the real embedding vector, the enrollment embedding vector, and the fake embedding vector.

The processor may be configured to determine a value of a first category corresponding to a case in which the biometric information is not forged, based on a first distance between the real embedding vector and the input embedding vector and a third distance between the enrollment embedding vector and the input embedding vector, to determine a value of a second category corresponding to a case in which the biometric information is forged, based on a second distance between the fake embedding vector and the input embedding vector, and to determine a confidence value of the input embedding vector based on the value of the first category and the value of the second category.

The processor may be configured to extract the input embedding vector from the biometric information using the first neural network. The first neural network may be trained based on live biometric information and spoof biometric information.

In another general aspect, an apparatus includes one or more processors configured to: extract an input embedding vector comprising a feature of biometric information included in input data; calculate a similarity value of the input embedding vector based on a fake embedding vector and one or both of a real embedding vector and an enrollment embedding vector; calculate a total forgery score based on the similarity value and an output vector of a neural network, which is trained using live biometric information and spoof biometric information; and determine whether the biometric information is forged based on the total forgery score.

The one or more processors may be configured to: determine that the biometric information is live information in a case in which the total forgery score is greater than a first threshold; and determine that biometric information is spoof information in a case in which the total forgery score is less than or equal to the first threshold.

The one or more processors may be configured to determine the first threshold based on a reject threshold corresponding to a maximum probability that an intermediate forgery score based on the output vector is determined to fall within a range in which the biometric information is determined as spoof information, and based on an accept threshold corresponding to a minimum probability that the intermediate forgery score is determined to fall within a range in which the biometric information is determined as live information.

Other features and aspects will be apparent from the following detailed description, the drawings, and the claims.

Figure 1:
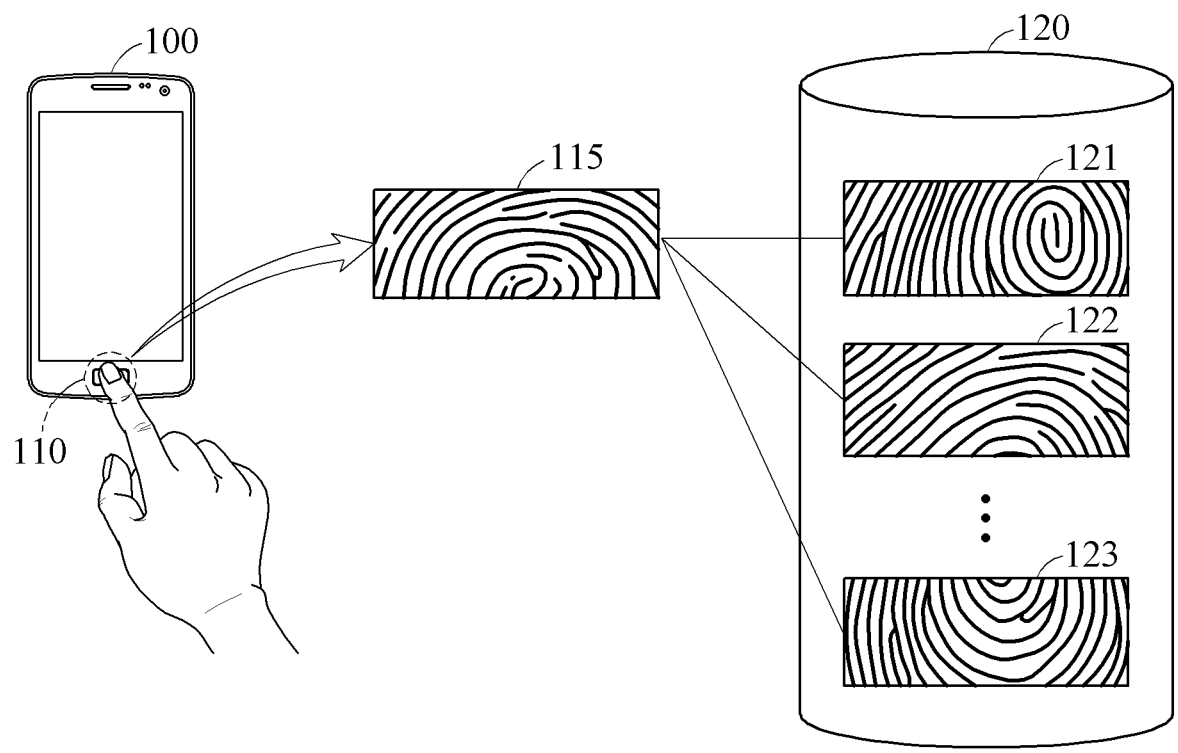
FIG. 1 illustrates an example of a biometric information recognition method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

The examples may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. In the drawings, like reference numerals are used for like elements.

FIG. 1 illustrates an example of a biometric information recognition method. For convenience of description of FIG. 1, biometric information is assumed to be a fingerprint. However, examples described herein may be equally applicable to a variety of biometric information that may be recognized in a form of an image, for example, a vein or an iris.

Referring to FIG. 1, a fingerprint recognition apparatus 100 may include a fingerprint sensor 110 configured to sense a fingerprint of a user. The fingerprint recognition apparatus 100 may acquire an input fingerprint image 115 representing a fingerprint of a user through the fingerprint sensor 110.

In an example, fingerprint enrollment may be performed for fingerprint recognition. Enrollment fingerprint images 121, 122, and 123 may be stored in advance in an enrollment fingerprint database (DB) 120 through a fingerprint enrollment process. For personal information protection, the enrollment fingerprint DB 120 may store features extracted from the enrollment fingerprint images 121, 122, and 123, instead of storing the enrollment fingerprint images 121, 122, and 123 without a change. The enrollment fingerprint DB 120 may be stored in a memory (not shown) included in the fingerprint recognition apparatus 100, or stored in an external device (not shown) such as a server capable of communicating with the fingerprint recognition apparatus 100.

For example, when the fingerprint recognition apparatus 100 receives the input fingerprint image 115 for authentication, the fingerprint recognition apparatus 100 may recognize the fingerprint of the user by comparing a fingerprint (hereinafter, referred to as an "input fingerprint") shown in the input fingerprint image 115 to enrollment fingerprints shown in the enrollment fingerprint images 121, 122, and 123. The fingerprint recognition apparatus 100 may compare features of the input fingerprint to features of the enrollment fingerprints. When a fake fingerprint is sensed in the input fingerprint image 115 and when the input fingerprint image 115 and one of the enrollment fingerprint images 121, 122, and 123 have similar fingerprint patterns, authentication of the fake fingerprint may be likely to succeed. To prevent such a spoofing attack, a process of determining whether the input fingerprint in the input fingerprint image 115 is a fake fingerprint or a real fingerprint of a human may be required.

If a result indicating that user information does not match is output from a recognition system, an authentication process may be immediately terminated with a mismatch message, and if it is determined that the user information matches is output, a process of determining whether corresponding biometric information is forged or spoofed may be performed by performing an anti-spoofing process. The term "spoof" used herein may be construed as including, for example, duplication, forgery, and falsification of biometric information. To pass final authentication, the biometric information may need to be determined as live biometric information in the process of detecting whether the biometric information is forged.

In an example, the fingerprint recognition apparatus 100 may include an anti-spoofing apparatus (not shown), to detect whether the input fingerprint is a fake fingerprint using the anti-spoofing apparatus. Hereinafter, the anti-spoofing apparatus may be referred to as a "fake fingerprint detection apparatus."

A typical fake fingerprint detection system may distinguish a real fingerprint from a fake fingerprint, using a neural network that is trained based on a DB provided in advance. However, in a predetermined situation in which the neural network does not learn, performance of the typical fake fingerprint detection system may decrease. For example, since the typical fake fingerprint detection system uses only dichotomous results of a universally trained network, regardless of features for each user, the performance of the typical fake fingerprint detection system may decrease due to a difference between biometric features (for example, a crack of a fingerprint, or a relatively pale fingerprint) based on users. Also, since biometric information used in training of the network is not used for authentication, the performance may decrease in a sensing situation in which it is difficult to train the network. In addition, the typical fake fingerprint detection system may fail to respond promptly to errors according to the usage environment or errors due to a time change such as aging, and may fail to support functions such as quick judgment in a middle process. Furthermore, when a new vulnerability related to detection of a fake fingerprint is discovered, the neural network may necessarily need to be retrained, and accordingly an emergency response may be difficult.

The fake fingerprint detection apparatus may determine whether the input fingerprint is a fake fingerprint, based on a plurality of unspecified real fingerprint features provided in advance, a plurality of unspecified fake fingerprint features provided in advance, and/or enrolled fingerprint features of a user of a device, non-limiting examples of which will be further described below. In addition, the fake fingerprint detection apparatus may first determine whether fingerprints, for which a presence or absence of a forgery may be clearly determined, are forged, and may then determine whether the remaining fingerprints are forged. Furthermore, the fake fingerprint detection apparatus may update the enrollment fingerprint DB using the input fingerprint. Thus, it may be possible to enhance the anti-spoofing performance of the fake fingerprint detection apparatus.

Figure 2:
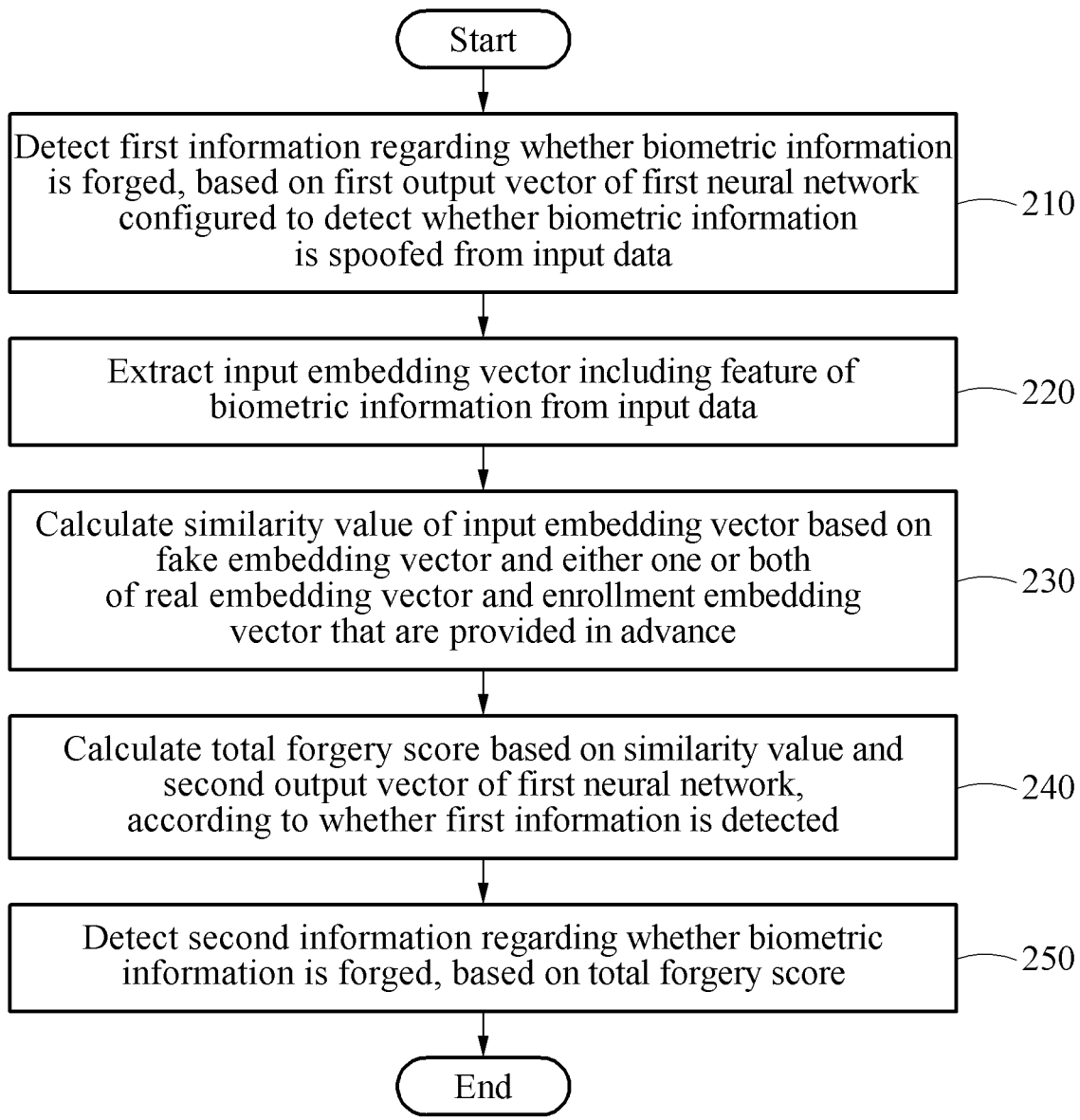
FIG. 2 illustrates an example of an anti-spoofing method.

FIG. 2 illustrates an example of an anti-spoofing method.

Referring to FIG. 2, operations 210 to 250 may be performed by the anti-spoofing apparatus described above with reference to FIG. 1. The anti-spoofing apparatus may be implemented by a hardware module, a software module, or various combinations thereof. Furthermore, although operations of FIG. 2 may be performed in the illustrated order and manner, the order of some operations may be changed or some operations may be omitted without departing from the spirit and scope of the examples, and multiple operations shown in FIG. 2 may be performed in parallel or concurrently.

In operation 210, the anti-spoofing apparatus may detect first information regarding whether biometric information is forged, based on a first output vector of a first neural network configured to detect whether biometric information is forged from input data including the biometric information.

The anti-spoofing apparatus may receive input data (for example, an image) including biometric information sensed from a user by various sensor(s).

The sensor(s) may include, for example, an ultrasonic fingerprint sensor, an optical fingerprint sensor, an electrostatic fingerprint sensor, a depth sensor, an iris sensor, or an image sensor, but is not limited thereto. One of the sensors may be used, or at least two of the sensors may also be used. The biometric information sensed by the sensor may be, for example, the input fingerprint image 115 of FIG. 1, an iris image, or a face image.

A single image or a plurality of images may include biometric information of a user. If one image includes biometric information of a user, one neural network may be used, and if a plurality of images include biometric information of a user, a number of neural networks corresponding to a number of the images may be used. For example, the anti-spoofing apparatus may acquire a 32-bit fingerprint image and an 8-bit fingerprint image.

The anti-spoofing apparatus may perform a first spoofing detection, that is, may first determine whether biometric information, for which a presence or absence of a forgery may be relatively clearly determined, is forged. The anti-spoofing apparatus may perform a second spoofing detection, that is, may re-determine whether biometric information, for which a presence or absence of a forgery is not determined in the first spoofing detection, is forged.

The anti-spoofing apparatus may extract a first output vector from an intermediate layer of the first neural network, and may calculate an intermediate forgery score based on the first output vector. The term "forgery score" used herein may refer to a forgery or alteration score. The anti-spoofing apparatus may determine whether the intermediate forgery score is a score in a threshold range for detection of the first information. When the intermediate forgery score is determined as the score in the threshold range, the first information may be detected based on the intermediate forgery score. An example of detecting the first information will be further described below with reference to FIGS. 3A to 3C.

Figure 3A:
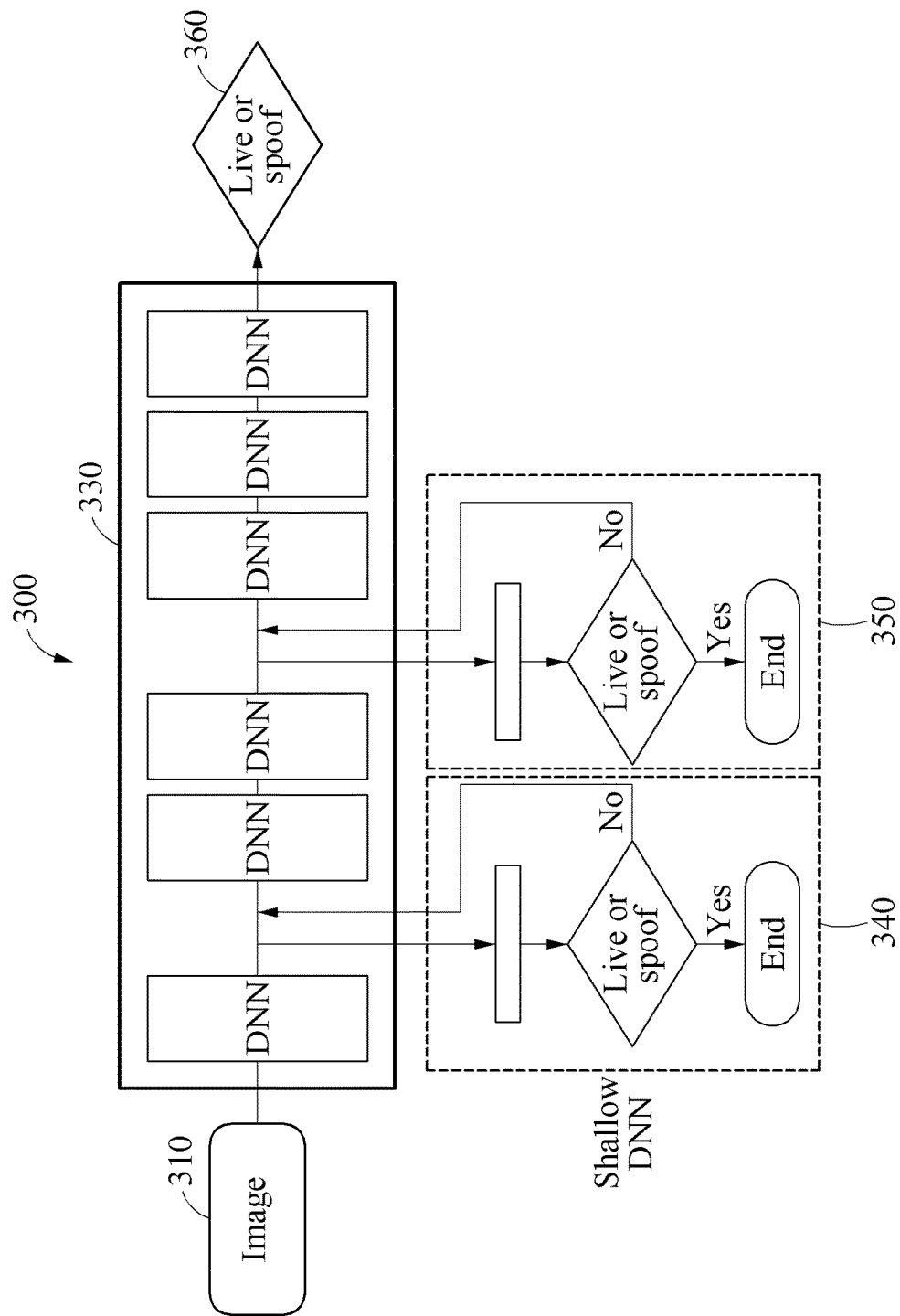
FIG. 3A illustrates an example of a network structure and operation of an apparatus for detecting whether biometric information is forged.
Figure 3B:
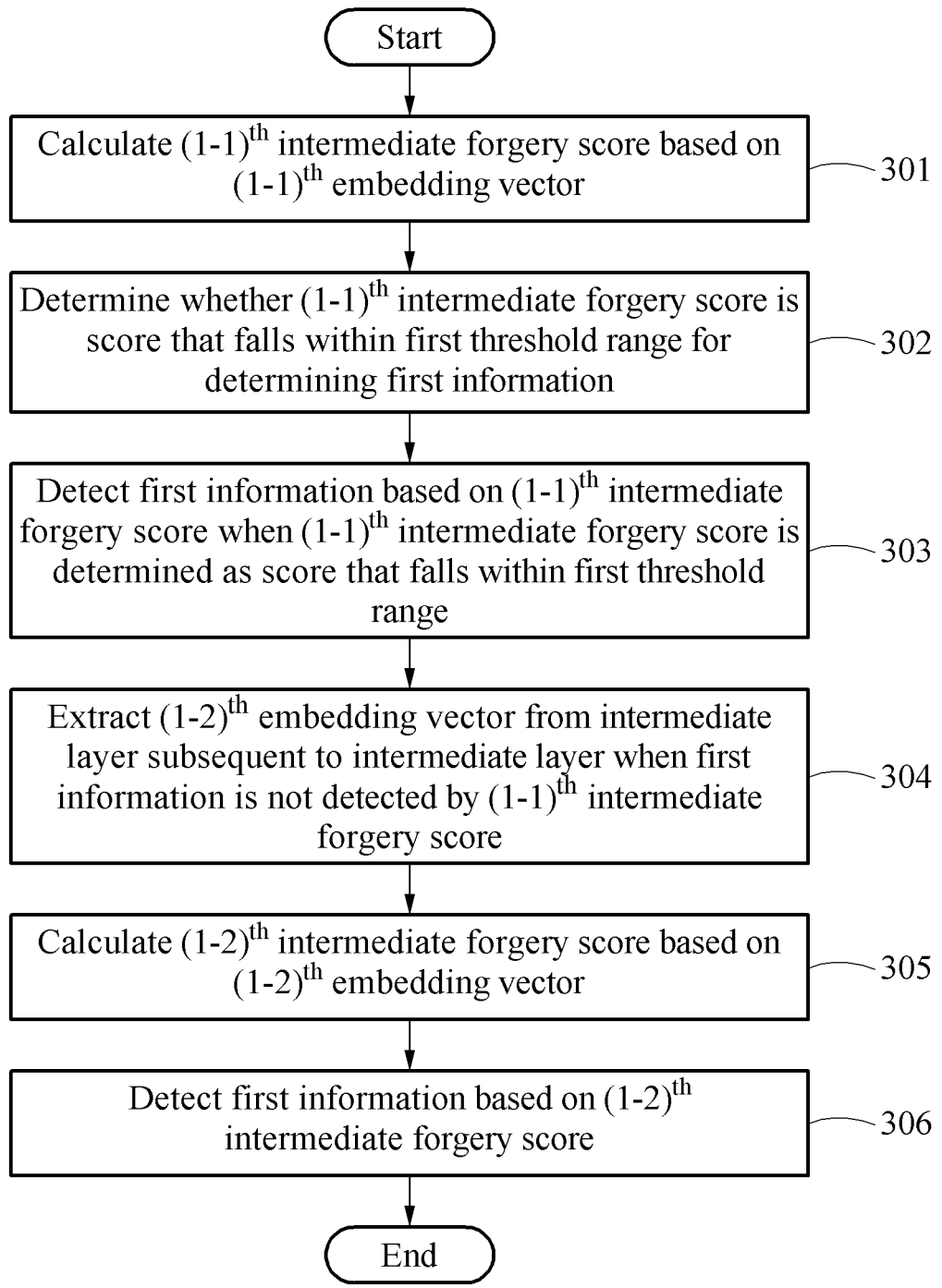
FIG. 3B illustrates an example of a method of detecting first information regarding whether biometric information is forged.

FIG. 3A illustrates an example of a network structure and operation of an apparatus for detecting whether biometric information is forged, and FIG. 3B illustrates an example of a method of detecting first information regarding whether biometric information is forged.

FIGS. 3A and 3B illustrate a structure and an operation of an anti-spoofing apparatus 300 that may include a $(1\text{-}1)^{th}$ classifier 340, a $(1\text{-}2)^{th}$ classifier 350, and a second classifier 360. The $(1\text{-}1)^{th}$ classifier 340 and the $(1\text{-}2)^{th}$ classifier 350 may each include a shallow deep neural network (DNN).

Unlike a classifier of a typical DNN with an end-to-end structure, the $(1\text{-}1)^{th}$ classifier 340 and the $(1\text{-}2)^{th}$ classifier 350 may receive input data 310 including biometric information and may classify whether the biometric information is forged from first output vectors extracted from intermediate layers of a DNN 330 during a network inference.

The first output vectors extracted from the intermediate layers of the DNN 330 may be applied to the $(1\text{-}1)^{th}$ classifier 340 and the $(1\text{-}2)^{th}$ classifier 350 and may be used to detect first information regarding whether the biometric information is forged. The $(1\text{-}1)^{th}$ classifier 340 and the $(1\text{-}2)^{th}$ classifier 350 may be classifiers trained to classify an input image based on output vectors. For example, the $(1\text{-}1)^{th}$ classifier 340 and the $(1\text{-}2)^{th}$ classifier 350 may include shallow DNNs which require a computation amount less than that of a DNN, and may quickly detect the first information without a decrease in a speed due to a relatively small overhead caused by an early decision (ED) in an intermediate layer.

An example in which the $(1\text{-}1)^{th}$ classifier 340 and the $(1\text{-}2)^{th}$ classifier 350 detect the first information will be described below. The anti-spoofing apparatus 300 may extract a first output vector (for example, a $(1\text{-}1)^{th}$ embedding vector) from an intermediate layer of the DNN 330 using the $(1\text{-}1)^{th}$ classifier 340. In operation 301, the anti-spoofing apparatus 300 may calculate a $(1\text{-}1)^{th}$ intermediate forgery score based on the extracted $(1\text{-}1)^{th}$ embedding vector. The anti-spoofing apparatus 300 may detect the first information based on the $(1\text{-}1)^{th}$ intermediate forgery score. In operation 302, the anti-spoofing apparatus 300 may determine whether the $(1\text{-}1)^{th}$ intermediate forgery score is a score in a first threshold range for determining the first information, using the $(1\text{-}1)^{th}$ classifier 340 that is trained. The anti-spoofing apparatus 300 may classify whether the $(1\text{-}1)^{th}$ intermediate forgery score is a score in a range in which the biometric information is determined as first spoof information, or a score in a range in which the biometric information is determined as live information.

For example, when the $(1\text{-}1)^{th}$ intermediate forgery score is determined as a score in the first threshold range, the anti-spoofing apparatus 300 may detect the first information based on the $(1\text{-}1)^{th}$ intermediate forgery score in operation 303.

When the first information is not detected by the $(1\text{-}1)^{th}$ intermediate forgery score, the anti-spoofing apparatus 300 may extract a $(1\text{-}2)^{th}$ embedding vector from an intermediate layer subsequent to the intermediate layer of the DNN 330 using the $(1\text{-}2)^{th}$ classifier 350 in operation 304.

In operation 305, the anti-spoofing apparatus 300 may calculate a $(1\text{-}2)^{th}$ intermediate forgery score based on the $(1\text{-}2)^{th}$ embedding vector.

In operation 306, the anti-spoofing apparatus 300 may detect the first information based on the $(1\text{-}2)^{th}$ intermediate forgery score calculated in operation 305. In operation 305, the anti-spoofing apparatus 300 may determine whether the $(1\text{-}2)^{th}$ intermediate forgery score is a score in the first threshold range for determining the first information, using the $(1\text{-}2)^{th}$ classifier 350 that is trained. The anti-spoofing apparatus 300 may classify whether the $(1\text{-}2)^{th}$ intermediate forgery score is a score in a range in which the biometric information is determined as first spoof information, or a score in a range in which the biometric information is determined as live information. For example, when the $(1\text{-}2)^{th}$ intermediate forgery score is determined as a score in the first threshold range, the anti-spoofing apparatus 300 may detect the first information based on the $(1\text{-}2)^{th}$ intermediate forgery score.

In an example, when the first information is detected by the $(1\text{-}2)^{th}$ intermediate forgery score, the anti-spoofing apparatus 300 may output a classification result of the $(1\text{-}2)^{th}$ classifier 350. In another example, when the first information is not detected by the $(1\text{-}2)^{th}$ intermediate forgery score, the anti-spoofing apparatus 300 may detect second information regarding whether the biometric information is forged, by applying a second output vector output from an output layer of the DNN 330 to the second classifier 360.

When the first information is detected through the $(1\text{-}1)^{th}$ classifier 340 and the $(1\text{-}2)^{th}$ classifier 350 that perform an early decision classification before the second output vector is derived from the output layer, the anti-spoofing apparatus 300 may immediately detect whether the biometric information is forged even though the second output vector is not used. Thus, it may be possible to reduce an amount of time used to determine whether the biometric information is forged.

When whether biometric information is forged is determined, an accuracy of the determining and a speed of detecting whether biometric information is forged may be in a trade-off relationship. The anti-spoofing apparatus 300 may use the $(1\text{-}1)^{th}$ classifier 340 and the $(1\text{-}2)^{th}$ classifier 350 for relatively quick determination. When the $(1\text{-}1)^{th}$ classifier 340 and the $(1\text{-}2)^{th}$ classifier 350 have relatively high detection confidence levels, the first information may be immediately used. When the $(1\text{-}1)^{th}$ classifier 340 and the $(1\text{-}2)^{th}$ classifier 350 have relatively low detection confidence levels, the second information may be determined from the second output vector by the second classifier 360.

Figure 3C:
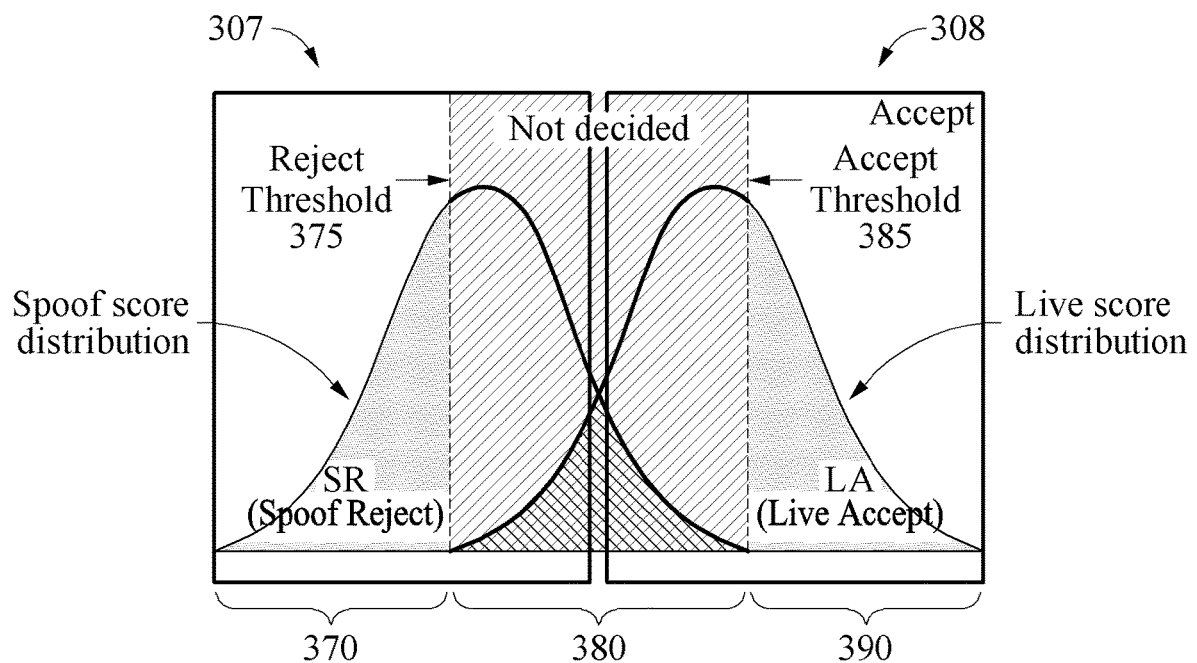
FIG. 3C illustrates an example of a first threshold range.

FIG. 3C illustrates an example of a first threshold range.

Referring to FIG. 3C, a graph 307 showing a probability distribution of a first forgery score corresponding to spoof information, and a graph 308 showing a probability distribution of a first forgery score corresponding to live information are illustrated.

In an example, if it is possible to clearly determine whether the first intermediate forgery score calculated based on the first output vector falls within a range in which biometric information is determined as live information or a range in which biometric information is determined as spoof information, the anti-spoofing apparatus 300 may immediately detect whether the biometric information is forged based on the first intermediate forgery score. In another example, if it is impossible to clearly determine whether the first intermediate forgery score falls within the range in which the biometric information is determined as live information or the range in which biometric information is determined as spoof information, the anti-spoofing apparatus 300 may not immediately determine whether the biometric information is forged based on the first intermediate forgery score.

In an example, the first threshold range may correspond to a probability range that may allow whether biometric information is forged to be clearly determined based on the first intermediate forgery score. The first threshold range may be for identifying a first intermediate forgery score for which a presence or absence of a forgery is not clearly determined. If whether a forgery occurs is not immediately determined by the first intermediate forgery score, the anti-spoofing apparatus 300 may determine whether a forgery occurs based on a second intermediate forgery score.

In the graph 307, a reject threshold 375 may correspond to a maximum value (Max(Spoof Score)) of a probability that the first intermediate forgery score is determined to fall within the range in which the biometric information is clearly determined as spoof information. In addition, in the graph 308, an accept threshold 385 may correspond to a minimum value (Min(Live Score)) of a probability that the first intermediate forgery score is determined to fall within the range in which the biometric information is clearly determined as live information.

The first threshold range may be determined based on the reject threshold 375 corresponding to the maximum probability (Max(Spoof Score)) that the first intermediate forgery score is determined to fall within the range in which the biometric information is determined as spoof information, and based on the accept threshold 385 corresponding to the minimum probability (Min(Live Score)) that the first intermediate forgery score is determined to fall within the range in which the biometric information is determined as live information. The first threshold range may correspond to a section 370 that is greater than the reject threshold 375 in the graph 307 and less than the accept threshold 385 in the graph 308. If the first intermediate forgery score is in the section 370 of the graph 307 that is less than or equal to the reject threshold 375, the first intermediate forgery score may be determined to fall within the range in which the biometric information is clearly determined as "spoof information". In addition, if the first intermediate forgery score is in the section 390 of the graph 308 that is greater than or equal to the accept threshold 385, the first intermediate forgery score may be determined to fall within the range in which the biometric information is clearly determined as "live information".

In an example, when the first intermediate forgery score falls within the sections 380 and 390, the anti-spoofing apparatus 300 may determine that the first intermediate forgery score falls within the first threshold range and may immediately detect the first information regarding whether the biometric information is forged based on the first intermediate forgery score. In another example, when the first intermediate forgery score falls within the section 370, the anti-spoofing apparatus 300 may determine that the first intermediate forgery score does not fall within the first threshold range and may immediately detect the second information regarding whether the biometric information is forged based on a second output vector and a similarity value that will be described below.

Referring back to FIG. 2, in operation 220, the anti-spoofing apparatus may extract an input embedding vector including a feature of the biometric information from the input data.

When biometric information sensed from the user is received, the anti-spoofing apparatus may extract an input embedding vector from input data including the biometric information.

The anti-spoofing apparatus may extract an input embedding vector from input biometric information using a neural network trained to extract a feature of the biometric information. The neural network may be trained based on a plurality of pieces of unspecified live biometric information and a plurality of pieces of unspecified spoof biometric information. An embedding vector generated by the neural network may include feature information of biometric information. The embedding vector may be referred to as a "feature vector".

In this example, the neural network may include the first neural network. Referring to FIG. 3A, the anti-spoofing apparatus 300 may extract an input embedding vector based on a $(1\text{-}1)^{th}$ output embedding vector.

In operation 230, the anti-spoofing apparatus may calculate a similarity value of the input embedding vector based on a fake embedding vector and either one or both of a real embedding vector and an enrollment embedding vector that are provided in advance.

The anti-spoofing apparatus may obtain a real embedding vector of a real model provided in advance based on live biometric information and/or an enrollment embedding vector of an enrollment model generated based on biometric information of a pre-enrolled user. The real model may correspond to a set of real embedding vectors extracted from a plurality of pieces of unspecified live biometric information. The pieces of unspecified live biometric information may be the same as those used to train the above-described neural network. The real model may include all a plurality of unspecified real embedding vectors, or may include only embedding vectors represented through clustering.

The enrollment model may be a set of enrollment embedding vectors extracted from biometric information (for example, the enrollment fingerprint images 121, 122, and 123 of FIG. 1) of a pre-enrolled user. The anti-spoofing apparatus may store the enrollment model in the enrollment fingerprint DB 120 of FIG. 1 during a fingerprint enrollment process.

The anti-spoofing apparatus may acquire a fake embedding vector of a fake model provided in advance based on spoof biometric information. The fake model may correspond to a set of fake embedding vectors extracted from a plurality of pieces of unspecified spoof biometric information. The pieces of unspecified spoof biometric information may be the same as those used to train the above-described neural network. The fake model may include all a plurality of unspecified real embedding vectors, or may include only embedding vectors represented through clustering.

The anti-spoofing apparatus may determine the similarity value of the input embedding vector, using a real embedding vector and/or an enrollment embedding vector together with a fake embedding vector. The similarity value of the input embedding vector may be an index indicating how close an input fingerprint image is to a real fingerprint. As the similarity value increases, a probability of the input fingerprint image being the real fingerprint may increase. An example of determining the similarity value will be further described below with reference to FIGS. 4A to 4C.

In operation 240, the anti-spoofing apparatus may calculate a total forgery score based on the similarity value and a second output vector of the first neural network, according to whether the first information is detected. As described above, the anti-spoofing apparatus may calculate the total forgery score based on the second output vector and the similarity value when the first information is not detected.

In an example, when the first information is not detected, the anti-spoofing apparatus may calculate a final forgery score based on a second output vector output from an output layer of the first neural network, and may calculate the total forgery score based on the final forgery score and the similarity value. For example, the anti-spoofing apparatus may perform a weighted summation of the final forgery score and the similarity value, and may calculate the total forgery score by applying a predetermined nonlinear function to a result of the weighted summation.

In operation 250, the anti-spoofing apparatus may detect second information regarding whether the biometric information is forged, based on the total forgery score. When the total forgery score is calculated, the anti-spoofing apparatus may compare the total forgery score to a first threshold for detecting the second information, and may detect the second information regarding whether the biometric information is forged.

For example, if the total forgery score is greater than the first threshold for detecting the second information, the anti-spoofing apparatus may determine corresponding biometric information as live information. If the total forgery score is less than or equal to the first threshold, the anti-spoofing apparatus may determine the corresponding biometric information as spoof information.

Although a fake fingerprint detector is designed based on a training DB provided in advance in the typical fake fingerprint detection system, covering all actual use environments with the training DB may not be realistic in terms of time and cost.

For example, a case in which it is difficult to cover an actual use environment with the training DB may be a case (hereinafter, referred to as a "terminal change case") in which a terminal itself changes, for example, a case in which a protective film is attached to the fake fingerprint detector, or a case in which there is a scratch on the fake fingerprint detector. Another case in which it is difficult to cover an actual use environment with the training DB may be a case (hereinafter, referred to as a "fingerprint change case") in which a fingerprint contracts or deforms depending on a use environment (for example, a low temperature, a high temperature, or a dry environment). In the above cases, it may be difficult to cover the actual use environment with the training DB, and accordingly performance of the fake fingerprint detector may decrease.

Accordingly, the anti-spoofing apparatus may determine whether an embedding vector update condition of the input embedding vector is satisfied based on the total forgery score, and may update any one or any combination of the enrollment embedding vector, the real embedding vector, and the fake embedding vector using the input embedding vector based on a determination that the embedding vector update condition is satisfied. The anti-spoofing apparatus may reflect the actual use environment by updating the anti-spoofing apparatus based on input data including biometric information, so that performance of determining whether a fingerprint is forged may be enhanced. An example of updating any one or any combination of an enrollment embedding vector, a real embedding vector, and a fake embedding vector using an embedding vector will be further described below with reference to FIGS. 5A and 5B.

Figure 4A:
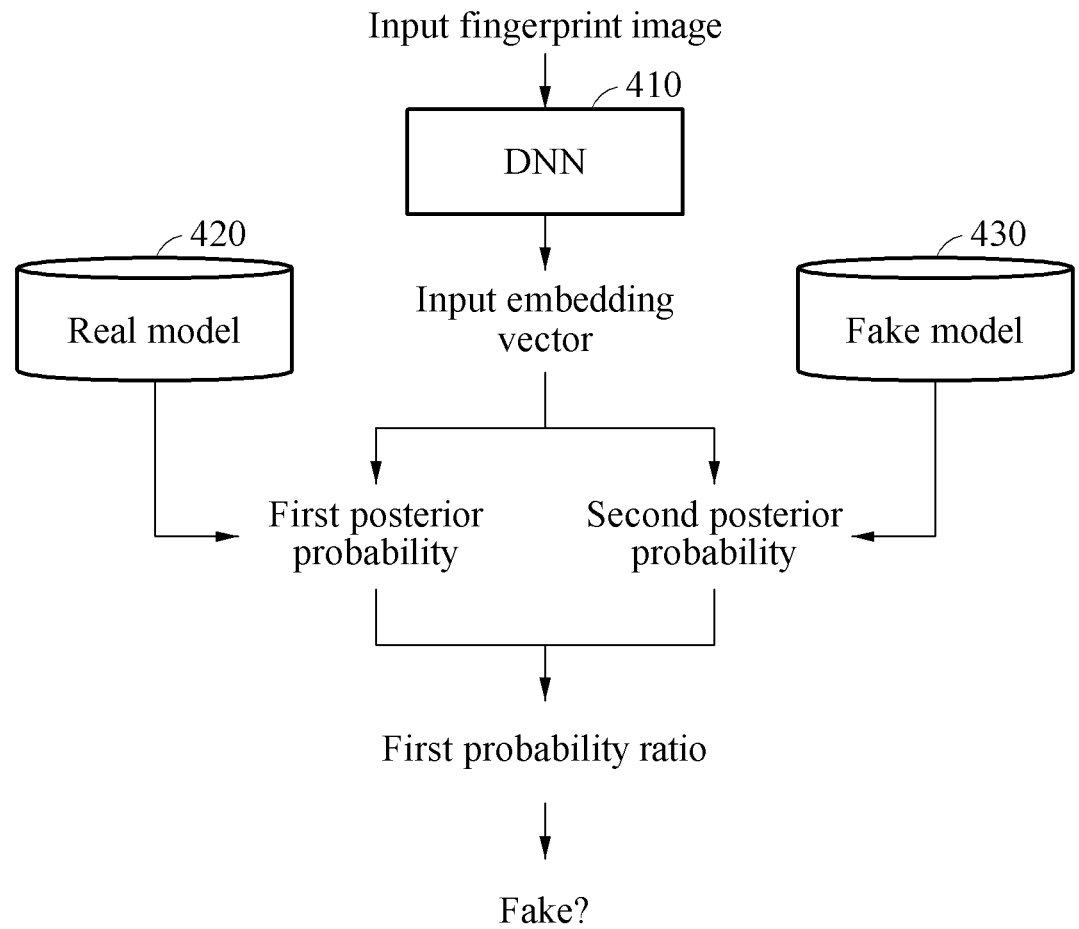
FIGS. 4A, 4B, and 4C illustrate examples of determining a similarity value of an input embedding vector based on an estimated posterior probability.
Figure 4B:
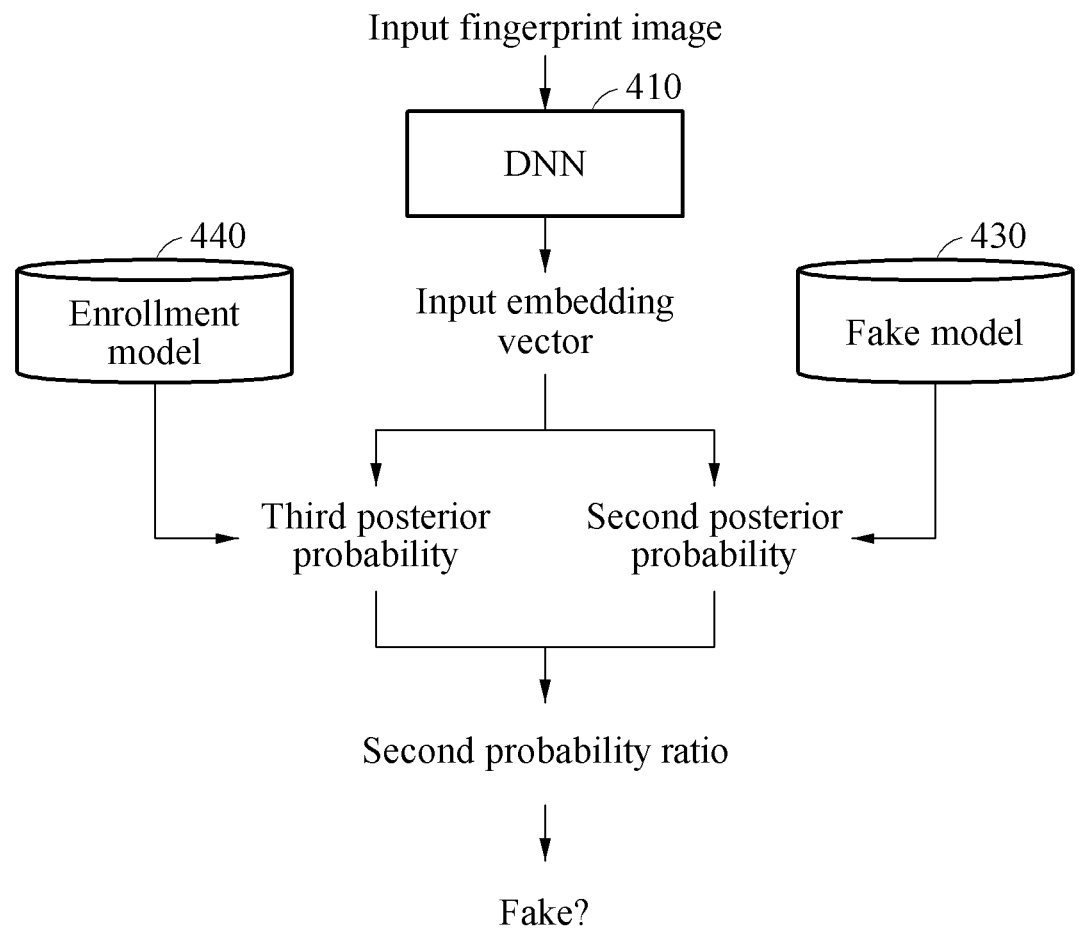
Figure 4C:
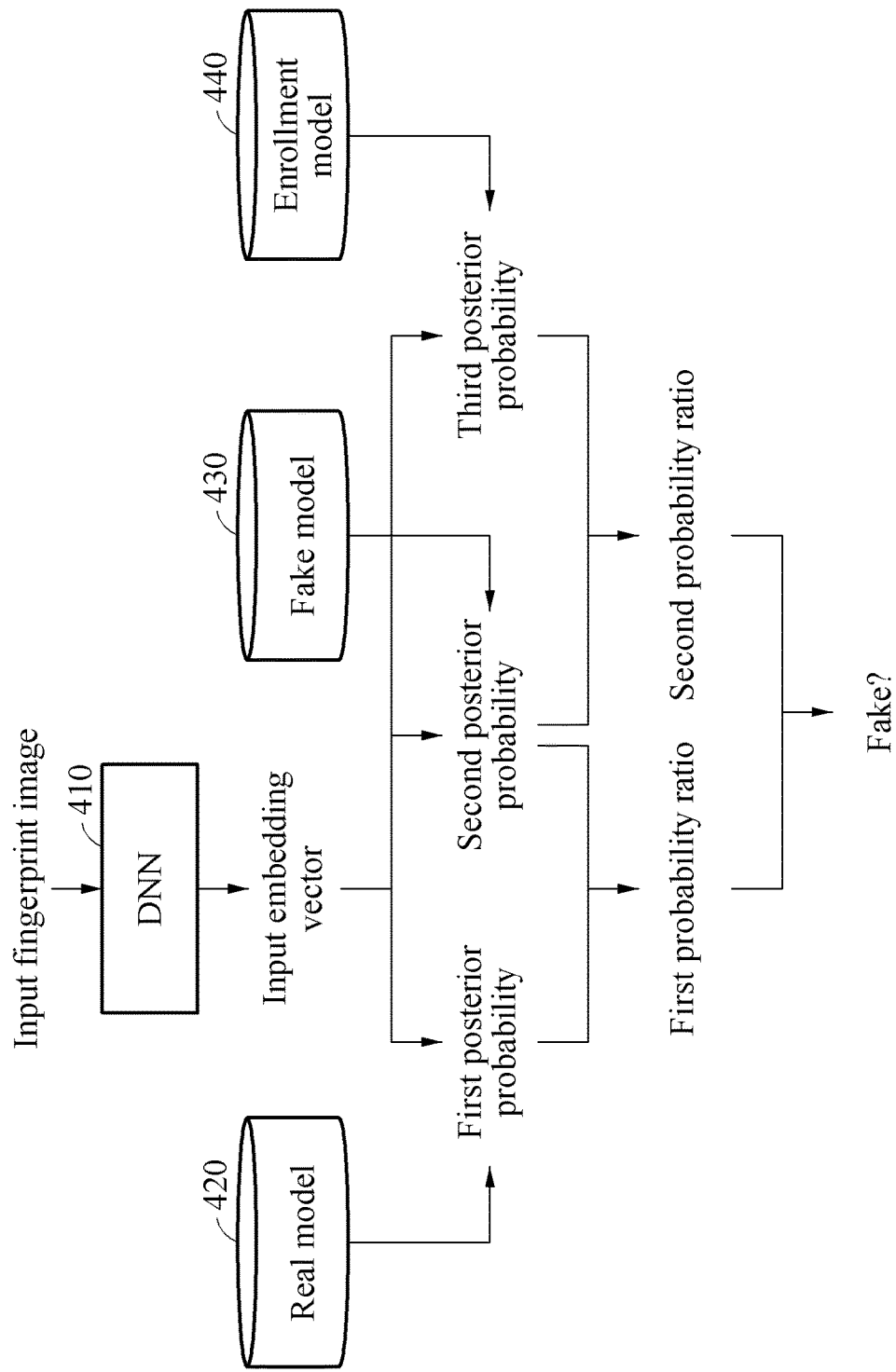

FIGS. 4A to 4C illustrate examples of determining a similarity value of an input embedding vector based on an estimated posterior probability.

Referring to FIG. 4A, an anti-spoofing apparatus may determine a similarity value of an input embedding vector based on a real embedding vector of a real model 420 and a fake embedding vector of a fake model 430. The anti-spoofing apparatus may extract an input embedding vector corresponding to input biometric information using a first neural network 410.

In an example, the anti-spoofing apparatus may estimate a first posterior probability between the input embedding vector and a representative embedding vector of the real model 420, and estimate a second posterior probability between the input embedding vector and a representative embedding vector set of the fake model 430.

The anti-spoofing apparatus may calculate a first probability ratio that is a probability ratio between the first posterior probability and the second posterior probability, and may determine the first probability ratio as a similarity value of the input embedding vector. For example, the first probability ratio may be calculated as shown in Expression 1 below.

$$\frac{\sup_{\theta \in \Theta_{real}} P(x \mid \theta)}{\frac{1}{N} \sum_{\theta_{fake} \in Nbest} P(x \mid \theta_{fake})} \qquad \text{Expression 1}$$

In another example, the anti-spoofing apparatus may estimate a first posterior probability between the input embedding vector and a representative embedding vector set of the real model 420, and a second posterior probability between the input embedding vector and a representative embedding vector set of the fake model 430. In this example, the first probability ratio may be calculated as shown in Expression 2 below.

$$\frac{\frac{1}{N} \sum_{\theta_{real} \in Nbest} P(x \mid \theta_{real})}{\frac{1}{N} \sum_{\theta_{fake} \in Nbest} P(x \mid \theta_{fake})} \qquad \text{Expression 2}$$

A numerator of Expression 2 may correspond to an average value of posterior probabilities between the input embedding vector and "N" real embedding vectors Nbest that are most similar to the input embedding vector among real embedding vectors included in the real model 420.

When the first probability ratio that is the similarity value of the input embedding vector is greater than or equal to a predetermined threshold, the anti-spoofing apparatus may determine that the input biometric information is not forged. When the first probability ratio is less than the threshold, the anti-spoofing apparatus may determine that the input biometric information is forged.

Referring to FIG. 4B, the anti-spoofing apparatus may determine a similarity value of an input embedding vector based on a fake embedding vector of a fake model 430 and an enrollment embedding vector of an enrollment model 440.

In an example, the anti-spoofing apparatus may estimate a third posterior probability between the input embedding vector and a representative embedding vector of the enrollment model 440, and a second posterior probability between the input embedding vector and a representative embedding vector set of the fake model 430.

In this example, the anti-spoofing apparatus may calculate a second probability ratio that is a probability ratio between the second posterior probability and the third posterior probability, and may determine the second probability ratio as a similarity value of the input embedding vector. For example, the second probability ratio may be calculated as shown in Expression 3 below.

$$\frac{sup_{\theta \in \Theta_{enroll}} P(x|\theta)}{\frac{1}{N}\sum_{\theta_{fake} \in Nbest} P(x|\theta_{fake})} \quad \text{Expression 3}$$

In another example, the anti-spoofing apparatus may estimate a third posterior probability between the input embedding vector and a representative embedding vector set of the enrollment model 440, and a second posterior probability between the input embedding vector and a representative embedding vector set of the fake model 430. In this example, the second probability ratio may be calculated as shown in Expression 4 below.

$$\frac{\frac{1}{N}\sum_{\theta_{enroll} \in Nbest} P(x|\theta_{enroll})}{\frac{1}{N}\sum_{\theta_{fake} \in Nbest} P(x|\theta_{fake})} \quad \text{Expression 4}$$

A numerator of Expression 4 may correspond to an average value of posterior probabilities between the input embedding vector and "N" enrollment embedding vectors Nbest that are most similar to the input embedding vector among enrollment embedding vectors included in the enrollment model 440.

When the second probability ratio that is the similarity value of the input embedding vector is greater than or equal to a predetermined threshold, the anti-spoofing apparatus may determine that the input biometric information is not forged. When the second probability ratio is less than the threshold, the anti-spoofing apparatus may determine that the input biometric information is forged.

To control variability of values or limit a range of values, the anti-spoofing apparatus may normalize a probability ratio using a log or sigmoid function. For example, the normalized probability ratio may be expressed as shown in Expression 5 below.

$$\frac{1}{1 + e - \log(\text{Probability ratio})} \quad \text{Expression 5}$$

When the normalized probability ratio that is the similarity value of the input embedding vector is greater than or equal to a predetermined threshold, the anti-spoofing apparatus may determine that the input biometric information is not forged. When the normalized probability ratio is less than the threshold, the anti-spoofing apparatus may determine that the input biometric information is forged.

Referring to FIG. 4C, the anti-spoofing apparatus may determine a similarity value of an input embedding vector based on a real embedding vector of a real model 420, a fake embedding vector of a fake model 430, and an enrollment embedding vector of an enrollment model 440. As described above with reference to FIGS. 4A and 4B, the anti-spoofing apparatus may calculate a first probability ratio and a second probability ratio, and may determine the similarity value of the input embedding vector based on the first probability ratio and the second probability ratio. For example, the anti-spoofing apparatus may determine a result of a weighted summation of the first probability ratio and the second probability ratio as the similarity value of the input embedding vector. The result of the weighted summation of the first probability ratio and the second probability ratio may be expressed as shown in Expression 6 below, for example.

$$\beta \frac{sup_{\theta \in \Theta_{real}} P(x|\theta)}{\frac{1}{N}\sum_{\theta_{fake} \in Nbest} P(x|\theta_{fake})} + \quad \text{Expression 6}$$

$$(1-\beta)\frac{sup_{\theta \in \Theta_{enroll}} P(x|\theta)}{\frac{1}{N}\sum_{\theta_{fake} \in Nbest} P(x|\theta_{fake})}$$

When the similarity value of the input embedding vector is greater than or equal to a predetermined threshold, the anti-spoofing apparatus may determine that the input biometric information is not forged. When the similarity value is less than the threshold, the anti-spoofing apparatus may determine that the input biometric information is forged. For example, the anti-spoofing apparatus may determine whether the input biometric information is forged based on Expression 7 shown below.

$$\beta \frac{sup_{\theta \in \Theta_{real}} P(x|\theta)}{\frac{1}{N}\sum_{\theta_{fake} \in Nbest} P(x|\theta_{fake})} + \quad \text{Expression 7}$$

$$(1-\beta)\frac{sup_{\theta \in \Theta_{enroll}} P(x|\theta)}{\frac{1}{N}\sum_{\theta_{fake} \in Nbest} P(x|\theta_{fake})} \begin{matrix} \text{accept} \\ \geq \\ < \\ \text{reject} \end{matrix} \gamma_{th}$$

Although not shown in the drawing, the anti-spoofing apparatus may determine a value of a first category corresponding to a case in which the input biometric information is not forged, based on a first distance between the real embedding vector and the input embedding vector and a third distance between the enrollment embedding vector and the input embedding vector. Also, the anti-spoofing apparatus may determine a value of a second category corresponding to a case in which the input biometric information is forged, based on a second distance between the fake embedding vector and the input embedding vector.

The anti-spoofing apparatus may determine the similarity value of the input embedding vector based on the value of the first category and the value of the second category. The anti-spoofing apparatus may calculate the similarity value of the input embedding vector by applying the value of the first category and the value of the second category to a softmax function.

In an example, the anti-spoofing apparatus may also determine the similarity value of the input embedding vector based on Expressions 8 and 9 shown below.

$$\frac{e^{-\frac{dist_{enroll}}{real}}}{e^{-\frac{dist_{enroll}}{real}} + e^{-dist_{fake}}} \quad \text{Expression 8}$$

In Expression 8, $dist_{fake}$ denotes a distance between the input embedding vector and the fake embedding vector and may correspond to the value of the second category. Also, $dist_{enroll/real}$ may be calculated by Expression 9 and may correspond to the value of the first category.

$$dist_{enroll/real} \gamma \times \min(dist_{enroll}, dist_{real}) + (1-\gamma) \times dist_{enroll} \quad \text{Expression 9:}$$

In Expression 9, $dist_{enroll}$ denotes a distance between the input embedding vector and the enrollment embedding vector, and $dist_{real}$ denotes a distance between the input embedding vector and the real embedding vector. Also, γ denotes a weight for a weighted summation and may have a value of "0.5".

Figure 5A:
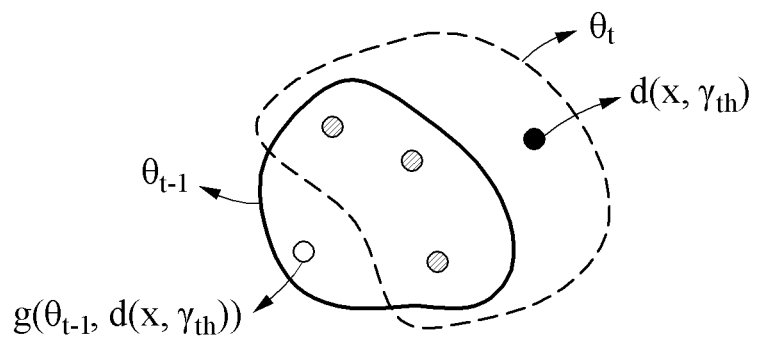
FIGS. 5A and 5B illustrate examples of updating an initial model and an enrollment model based on an input embedding vector.
Figure 5B:
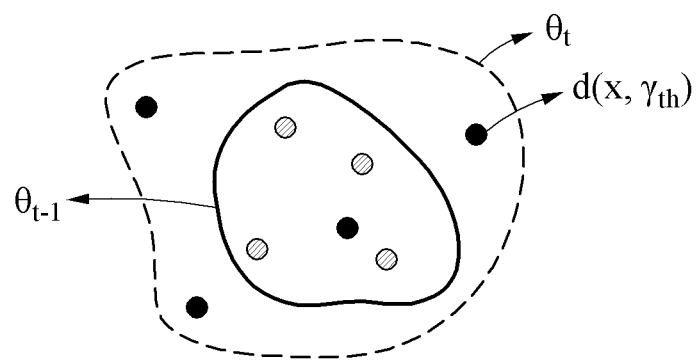

FIGS. 5A and 5B illustrate examples of updating an initial model and an enrollment model based on an input embedding vector.

Referring to FIG. 5A, a fake fingerprint detection apparatus may determine whether a number of pieces of fingerprint data stored in the initial model or the enrollment model reaches a storage limit. If the number of pieces of fingerprint data in the initial model or the enrollment model reaches the storage limit, the fake fingerprint detection apparatus may determine fingerprint data to be removed from a corresponding model. The above updating method according to FIG. 5A is mainly used when an initial model is updated according to a terminal change case, but is not limited thereto.

Referring to FIG. 5B, when a number of pieces of fingerprint data stored in the initial model or the enrollment model does not reach the storage limit, the fake fingerprint detection apparatus may add an input embedding vector to a corresponding model until the number of pieces of fingerprint data reaches the storage limit. The above updating method according to FIG. 5B is mainly used when the enrollment model is updated according to a fingerprint change case, but is not limited thereto.

An example of updating the above-described initial model and enrollment model may be expressed as shown in Expression 10 below.

$$\theta_t = \theta_{t-1} \cup \{d(x, \gamma_{th})\} - \{g(\theta_{t-1})\} \quad \text{Expression 10:}$$

In Expression 10, $\theta_t$ denotes the updated initial model or the updated enrollment model, $\theta_{t-1}$ denotes an initial model or enrollment model that is not updated, $d(x, \gamma_{th})$ denotes an input embedding vector with a first confidence value greater than or equal to a first threshold, and $g(\theta_{t-1})$ denotes removed fingerprint data.

Figure 6A:
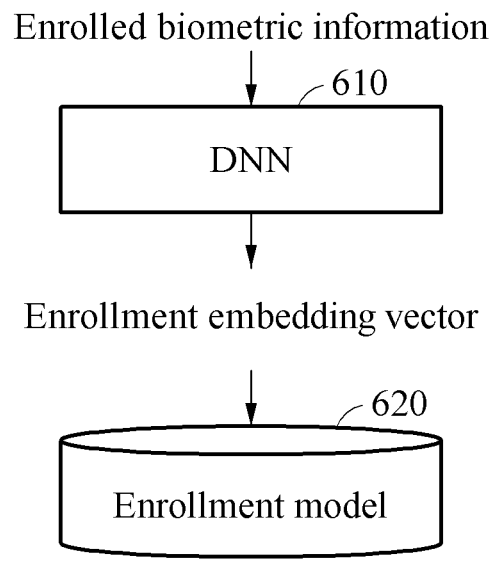
FIGS. 6A and 6B illustrate examples of enrolling biometric information through anti-spoofing.
Figure 6B:
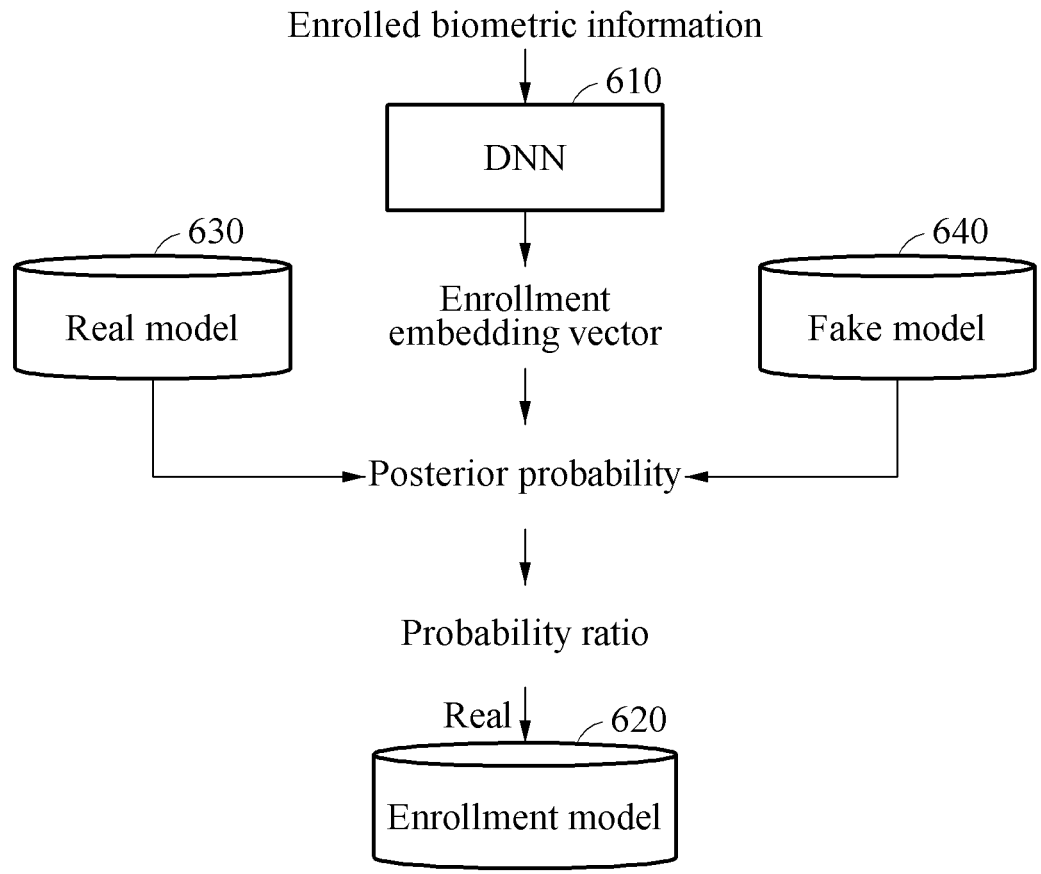

FIGS. 6A and 6B illustrate examples of enrolling biometric information through anti-spoofing.

An anti-spoofing apparatus may generate an enrollment model based on enrolled biometric information for biometric authentication. In an example, the enrollment model may be generated under assumption that all the enrolled biometric information is not forged. In another example, the enrollment model may be generated based on enrolled biometric information determined not to be forged, using a real model and a fake model.

Referring to FIG. 6A, the anti-spoofing apparatus may generate an enrollment model under assumption that all enrolled biometric information is not forged. The anti-spoofing apparatus may extract an enrollment embedding vector corresponding to the enrolled biometric information using a first neural network 610, and may store the enrollment embedding vector in an enrollment model 620.

Referring to FIG. 6B, the anti-spoofing apparatus may generate an enrollment model based on enrolled biometric information determined not to be forged, using a real model 630 and a fake model 640. The anti-spoofing apparatus may extract an enrollment embedding vector corresponding to the enrolled biometric information using the first neural network 610, may estimate a posterior probability between the enrollment embedding vector and a real embedding vector of the real model 630 and a posterior probability between the enrollment embedding vector and a fake embedding vector of the fake model 640, and may determine a confidence value of the enrollment embedding vector based on a probability ratio between the estimated posterior probabilities. The anti-spoofing apparatus may store an enrollment embedding vector with a confidence value that is greater than or equal to a predetermined threshold in the enrollment model 620.

The anti-spoofing apparatus may receive input data including live biometric information in a normal state and may determine whether biometric information is forged. In an example, since an input embedding vector corresponding to a real fingerprint image representing a normal fingerprint is similar to an enrollment embedding vector corresponding to an enrollment fingerprint image rather than a fake embedding vector corresponding to a fake fingerprint image, the anti-spoofing apparatus may determine an input fingerprint included in the real fingerprint image to be a real fingerprint of a person, not a fake fingerprint.

In another example, the anti-spoofing apparatus may receive a real fingerprint image representing a dry fingerprint as an input fingerprint image and may determine whether a forgery occurs. Since the input embedding vector corresponding to the real fingerprint image representing the dry fingerprint is similar to the fake embedding vector rather than the enrollment embedding vector, the anti-spoofing apparatus may incorrectly determine an input fingerprint included in the real fingerprint image representing the dry fingerprint as a fake fingerprint.

As described above, since fingerprint enrollment is performed only once in a predetermined environment, the fake fingerprint detection apparatus may incorrectly determine a real fingerprint of a person to be a fake fingerprint in an environment different from an environment at a point in time of enrollment. Hereinafter, an example of fake fingerprint determination based on a virtual enrollment fingerprint embedding vector generated based on an enrollment fingerprint image will be described with reference to FIGS. 7A to 7D. An anti-spoofing apparatus may input an enrollment fingerprint image of a normal fingerprint to an artificial neural network (ANN) capable of changing a condition of a fingerprint to a dry condition, an oily condition or a low temperature condition, for example, may generate a virtual enrollment image that has a changed environmental characteristic while maintaining a structural characteristic, and may use the virtual enrollment image to determine whether a fingerprint is forged. An example of generating a virtual enrollment fingerprint embedding vector will be further described below with reference to FIGS. 7A to 7D.

FIGS. 7A to 7D illustrate examples of generating a virtual embedding vector.

Figure 7A:
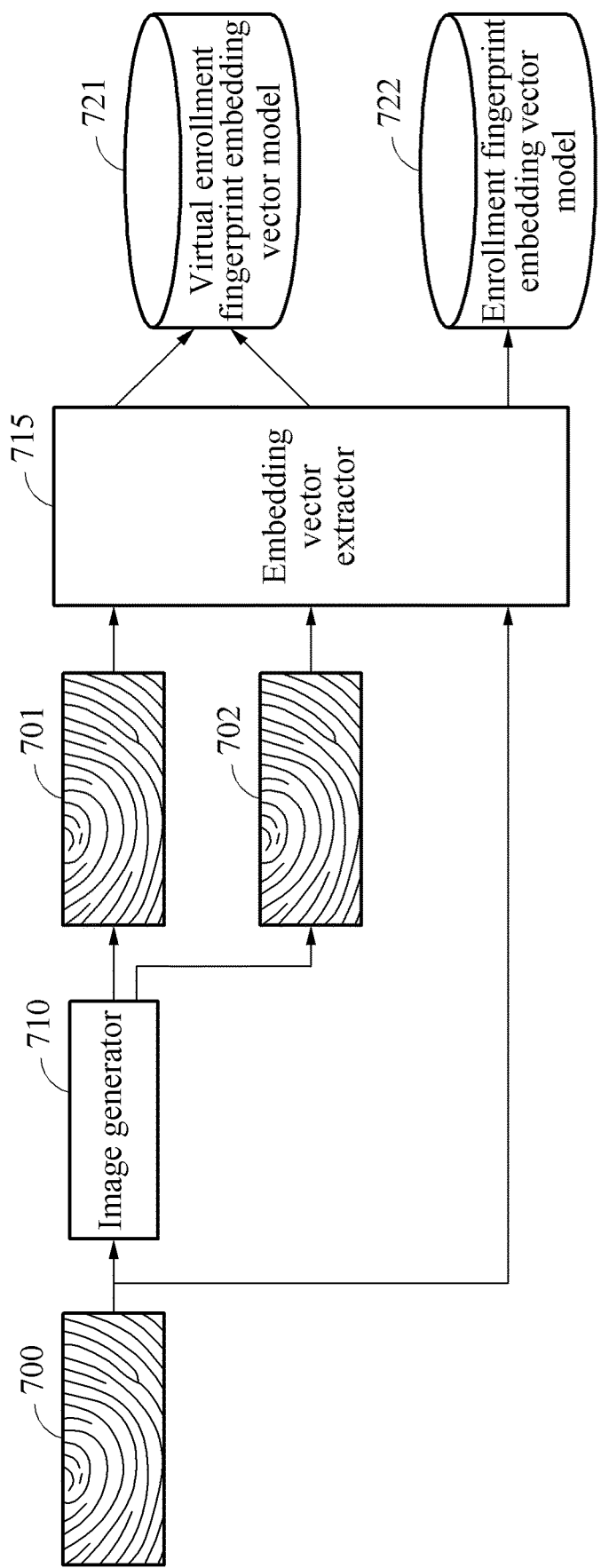
FIGS. 7A, 7B, 7C, and 7D illustrate examples of generating a virtual embedding vector.

Referring to FIG. 7A, the anti-spoofing apparatus may generate virtual enrollment fingerprint images 701 and 702 by inputting an enrollment fingerprint image 700 to an image generator 710 constructed with an ANN.

The anti-spoofing apparatus may input the virtual enrollment fingerprint image 701 representing a dry fingerprint to an embedding vector extractor 715, to generate a dry-condition virtual enrollment fingerprint embedding vector set including one or more virtual enrollment fingerprint embedding vectors corresponding to the dry fingerprint. Similarly, the anti-spoofing apparatus may input the virtual enrollment fingerprint image 702 representing an oily fingerprint to the embedding vector extractor 715, to generate an oily-condition virtual enrollment fingerprint embedding vector set including one or more virtual enrollment fingerprint embedding vectors corresponding to the oily fingerprint.

The anti-spoofing apparatus may construct a virtual enrollment fingerprint embedding vector model 721 based on the generated dry-condition virtual enrollment fingerprint embedding vector set and the generated oily-condition virtual enrollment fingerprint embedding vector set.

The anti-spoofing apparatus may input the enrollment fingerprint image 700 to the embedding vector extractor 715, to generate an enrollment fingerprint embedding vector, and may construct an enrollment fingerprint embedding vector model 722 based on the enrollment fingerprint embedding vector. The virtual enrollment fingerprint embedding vector model 721 and the enrollment fingerprint embedding vector model 722 may be stored in an enrollment fingerprint DB.

Figure 7B:
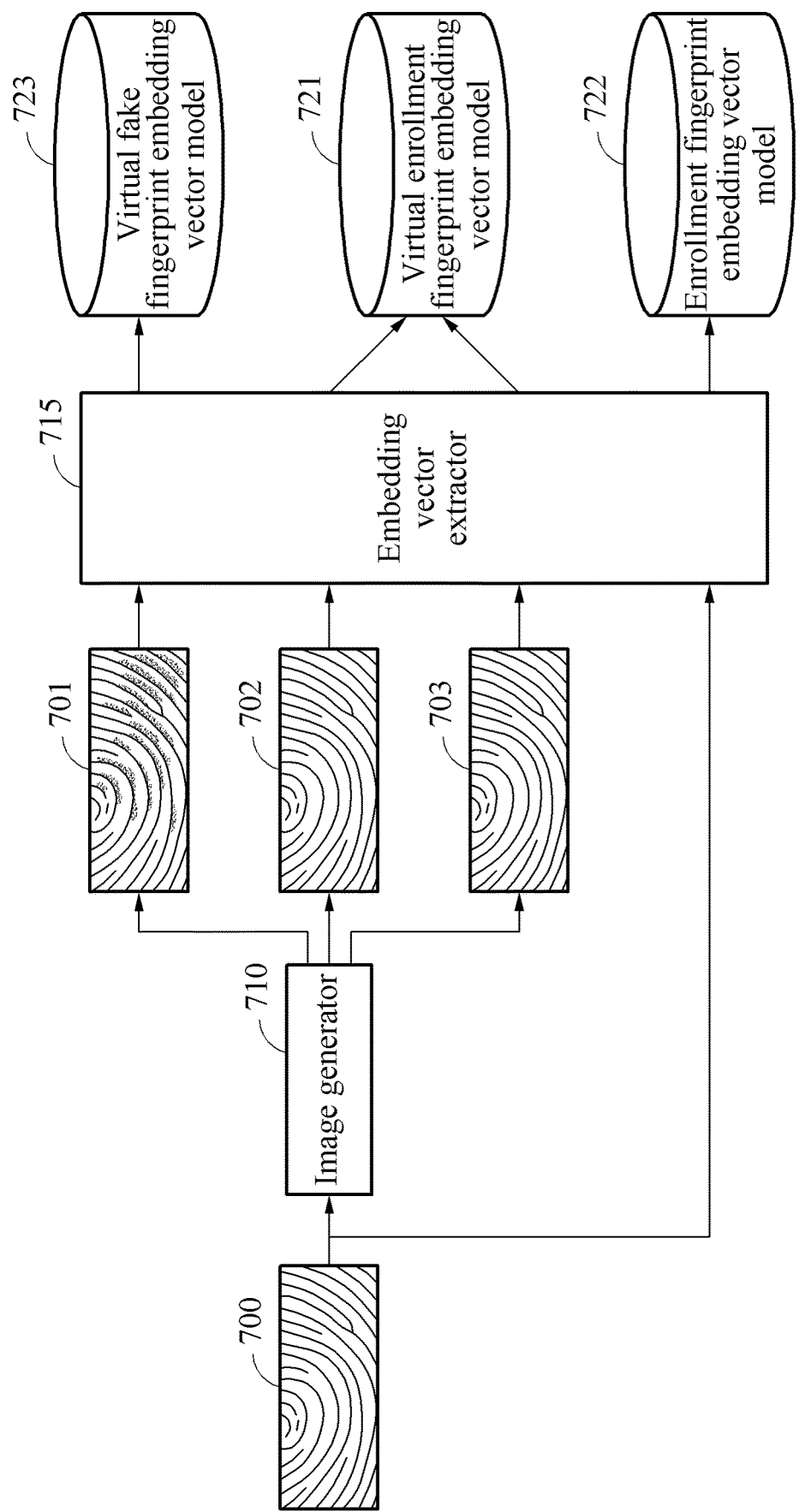

Referring to FIG. 7B, the anti-spoofing apparatus may further generate a virtual fake fingerprint image 703 by inputting the enrollment fingerprint image 700 to the image generator 710. The anti-spoofing apparatus may determine whether spoofing occurs, based on the virtual fake fingerprint image 703 that maintains a structural characteristic of the enrollment fingerprint image 700, thereby enhancing the performance of determining whether an input fingerprint image is forged.

The anti-spoofing apparatus may input the virtual fake fingerprint image 703 to the embedding vector extractor 715, may generate a virtual fake fingerprint embedding vector set including one or more virtual fake fingerprint embedding vectors, and may construct a virtual fake fingerprint embedding vector model 723 based on the virtual fake fingerprint embedding vector set.

Figure 7C:
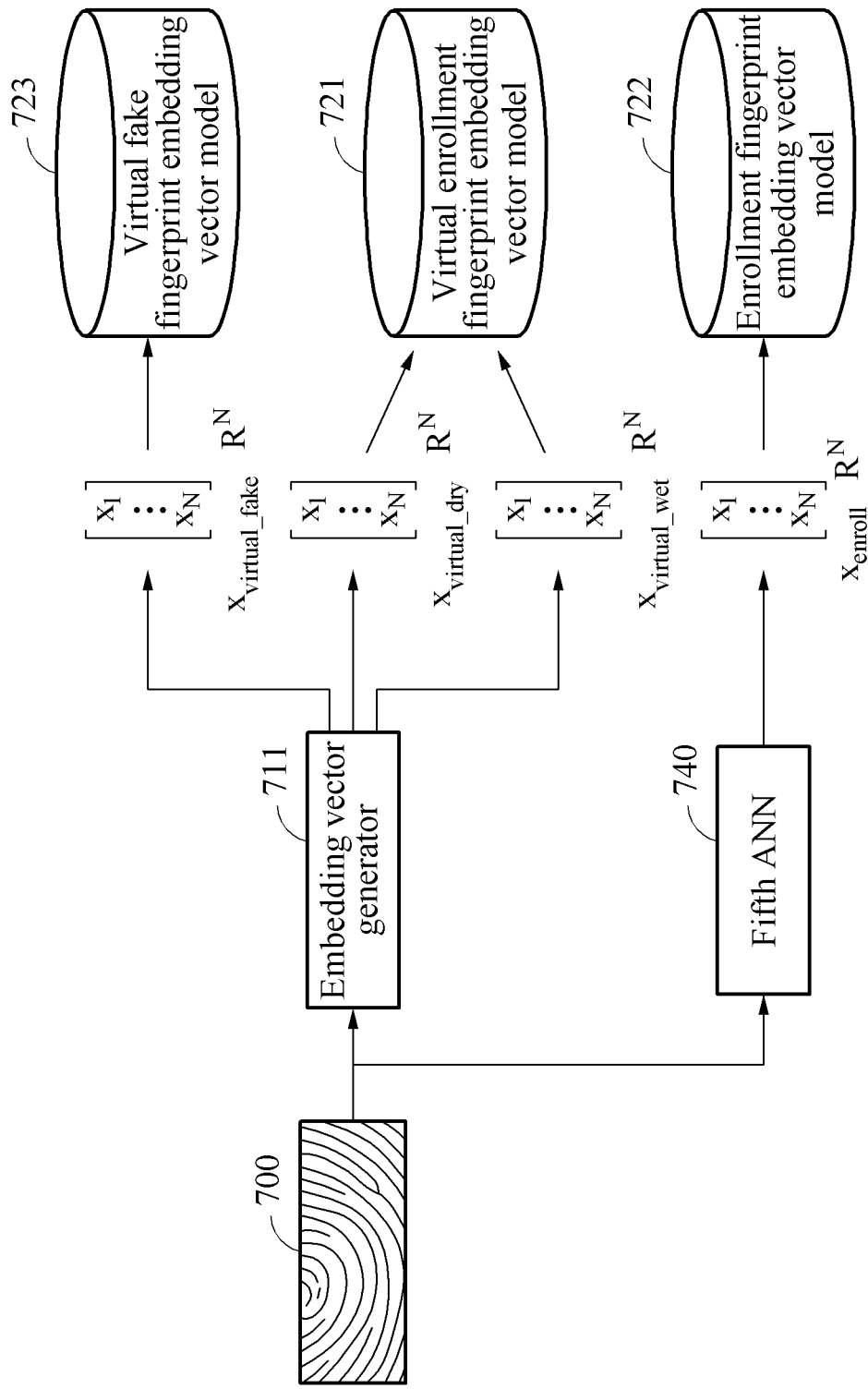

Referring to FIG. 7C, the anti-spoofing apparatus may generate a virtual enrollment fingerprint embedding vector directly from the enrollment fingerprint image 700, instead of generating a virtual enrollment fingerprint image. The anti-spoofing apparatus may input the enrollment fingerprint image 700 to a fifth ANN 740, and may generate a plurality of virtual enrollment fingerprint embedding vector sets having different environmental characteristics. The anti-spoofing apparatus may construct the virtual enrollment fingerprint embedding vector model 721 based on the plurality of generated virtual enrollment fingerprint embedding vector sets (for example, a dry-condition virtual enrollment fingerprint embedding vector set, and an oily-condition virtual enrollment fingerprint embedding vector set).

In addition, the anti-spoofing apparatus may input the enrollment fingerprint image 700 to an embedding vector generator 711, may generate a virtual fake fingerprint embedding vector set including one or more virtual fake fingerprint embedding vectors, and may construct the virtual fake fingerprint embedding vector model 723 based on the virtual fake fingerprint embedding vector set. An example of operations of the image generator 710 and the embedding vector generator 711 will be further described below with reference to FIG. 7D.

Figure 7D:
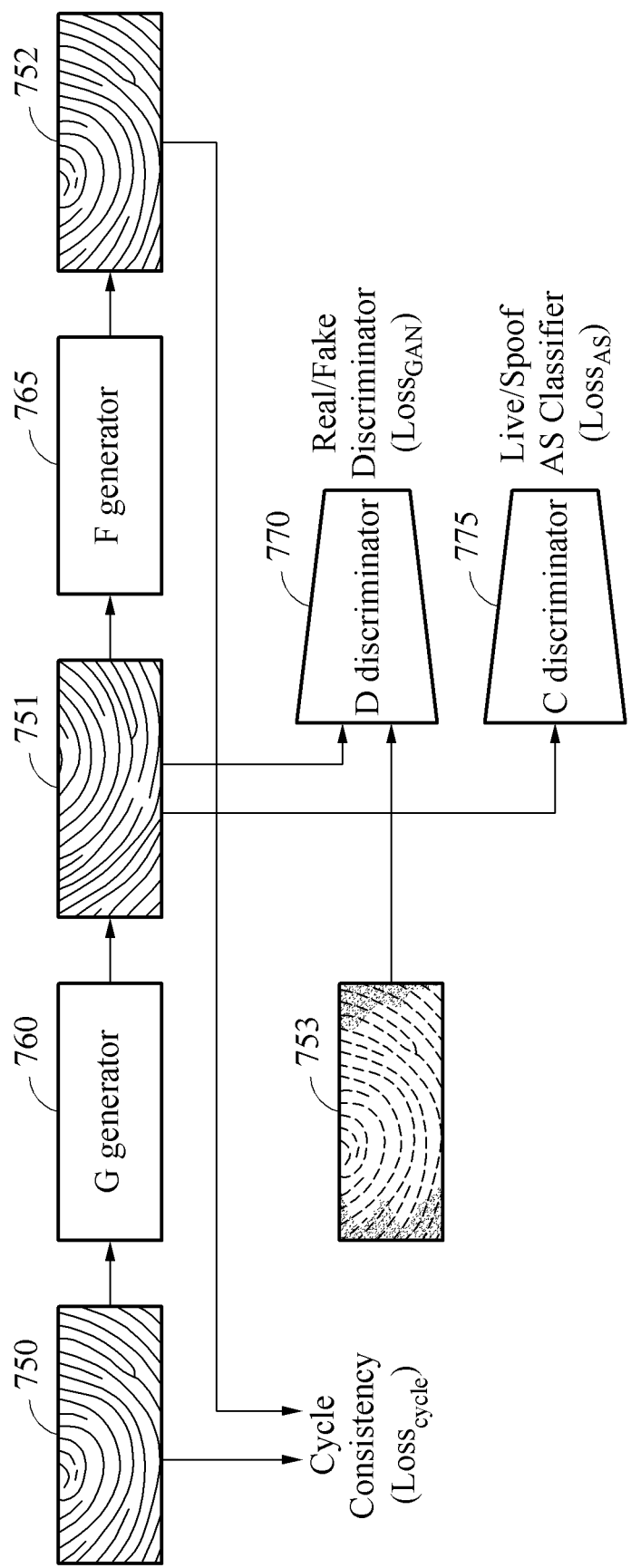

FIG. 7D illustrates an example of an operation of an image generator 710 and an embedding vector generator 711.

Referring to FIG. 7D, the image generator 710 and the embedding vector generator 711 may operate based on the same principle. For convenience of description, description is given based on an operation of the image generator 710.

The image generator 710 may be implemented by an ANN, and the ANN may be trained so that a virtual enrollment fingerprint image may have an environmental characteristic different from that of an enrollment fingerprint image 750 while maintaining a structural characteristic of the enrollment fingerprint image 750.

The ANN may include a G generator 760, an F generator 765, a D discriminator 770, and a C discriminator 775. The ANN may generate desired output data without a pair of training data.

The G generator 760 may convert the enrollment fingerprint image 750 into a virtual enrollment fingerprint image 751, and the F generator 765 may restore the virtual enrollment fingerprint image 751 to an enrollment fingerprint image. The ANN may determine a model parameter that minimizes a difference between an enrollment fingerprint image 752 restored in a training operation and the original enrollment fingerprint image 750.

The D discriminator 770 may function to allow the virtual enrollment fingerprint image 751 to have a desired environmental characteristic. The D discriminator 770 may be trained so that the virtual enrollment fingerprint image 751 may have a predetermined environmental characteristic based on fingerprint images 753 having predetermined environmental characteristics. For example, to train the virtual enrollment fingerprint image 751 as a virtual enrollment fingerprint image representing a dry fingerprint, the ANN may determine a model parameter that minimizes a difference between fingerprint images representing dry fingerprints and the virtual enrollment fingerprint image 751.

The C discriminator 775 may function to allow the virtual enrollment fingerprint image 751 to have a characteristic of a real fingerprint image, not a fake fingerprint image. For example, a real fingerprint image representing a dry fingerprint and a fake fingerprint image representing a fingerprint forged using wood glue may have similar characteristics, and a real fingerprint image representing an oily fingerprint and a fake fingerprint image representing a fingerprint forged using gelatin may have similar characteristics. Accordingly, the C discriminator 775 may determine a model parameter that minimizes a difference between the virtual enrollment fingerprint image 751 and a real fingerprint image.

The ANN may be trained in order to determine a model parameter that minimizes a loss function. The loss function may be used as an indicator to determine an optimal model parameter in a process of training the ANN. A model parameter may be a parameter determined through training, and may include a weight of a synaptic connection or a bias of a neuron. In addition, a hyperparameter may be a parameter that needs to be set before learning in a machine learning algorithm, and may include a learning rate, a number of repetitions, a mini-batch size, or an initialization function. The loss function may be expressed as shown in Expression 11 below.

$$\text{Loss} = \text{Loss}_{GAN}(G,D,I_E,I_V) + \text{Loss}_{GAN}(F,D,I_V,I_E) + \lambda_1 \text{Loss}_{cycle}(G,F) + \lambda_2 \text{Loss}_{As}(G,F) \quad \text{Expression 11:}$$

In Expression 11, $I_E$ is the enrollment fingerprint image 750, $I_V$ is the virtual enrollment fingerprint image 751, $I_{E'}$ is the restored enrollment fingerprint image 752, G is a function of converting the enrollment fingerprint image 750 into the virtual enrollment fingerprint image 751, F is a function of converting the virtual enrollment fingerprint image 751 into the restored enrollment fingerprint image 752, and D is a discriminator that determines whether the virtual enrollment fingerprint image 751 has a predetermined environmental characteristic.

Figure 8A:
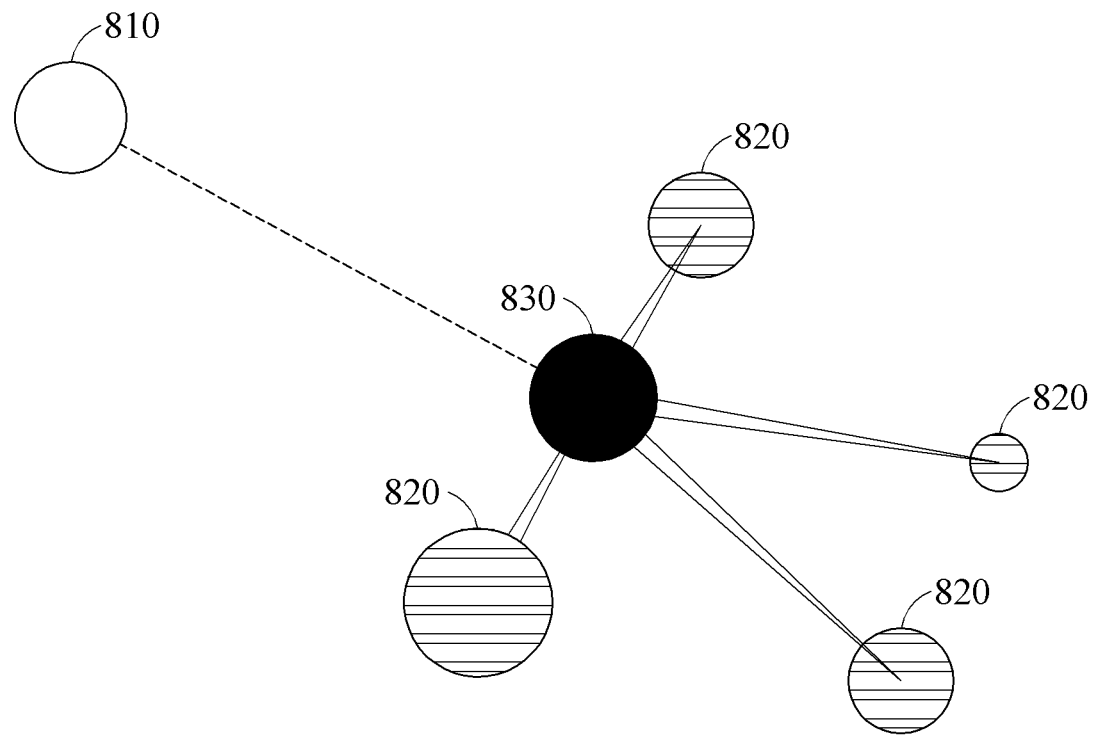
FIG. 8A three-dimensionally illustrates an example of a relationship between an embedding vector combined from embedding vectors that attempt enrollment and an input embedding vector that attempts authentication.

FIG. 8A three-dimensionally illustrates an example of a relationship between an embedding vector combined from embedding vectors that attempt enrollment and an input embedding vector that attempts authentication.

FIG. 8A illustrates an input embedding vector 810, enrollment embedding vectors 820 in an embedding cluster, and an embedding vector 830 (hereinafter, referred to as an "adaptive embedding vector") that is adaptive to the input embedding vector 810 and that is determined by a combination of the enrollment embedding vectors 820.

For example, a plurality of enrollment embedding vectors 820 included in the embedding cluster based on enrollment data may be assumed to be sparsely arranged. In this example, a similarity between the input embedding vector 810 in the embedding cluster and an enrollment embedding vector nearest to the input embedding vector 810, or a similarity between the input embedding vector 810 and a statistically representative embedding vector, for example, an average value of the enrollment embedding vectors 820 included in the embedding cluster, may indicate a result different from an actual similarity.

In the similarity between the input embedding vector 810 and the nearest enrollment embedding vector, a blind spot may be caused by a sparse distribution of enrollment embedding vectors in an embedding space. In addition, the similarity between the input embedding vector 810 and the statistically representative embedding vector may dilute the meaning of individual enrollment embedding vectors in the embedding cluster.

In an example, by determining the adaptive embedding vector 830 to the input embedding vector 810 through a combination of the plurality of enrollment embedding vectors 820, the blind spot in the embedding space may be eliminated and dilution of the meaning of individual embedding vectors may be prevented. In this example, the adaptive embedding vector 830 may correspond to an embedding vector most similar to the input embedding vector 810 among combinations of the enrollment embedding vectors 820 in the embedding cluster. In addition, a combination of embedding vectors similar to the input embedding vector 810 among the combinations of the enrollment embedding vectors 820 may be referred to as a "combination embedding vector". The combination embedding vector may correspond to candidate(s) of the adaptive embedding vector 830. For example, a finally determined combination embedding vector among combination embedding vectors may be the adaptive embedding vector 830. If one combination embedding vector is provided, the combination embedding vector may be the adaptive embedding vector 830.

In an example, physical sparsity in the embedding cluster may be resolved using a combination and/or interpolation of the enrollment embedding vectors 820 included in the embedding cluster. In this example, various examples may be provided according to a combination scheme of the enrollment embedding vectors 820. For example, if a combination embedding vector by an arbitrary combination f of the enrollment embedding vectors 820 is denoted by $\hat{x}^c$, an optimal combination $f^O$ to be obtained may be represented as shown in Expression 12 below.

$$f^O = \mathrm{argmin}_f L(S(x^i, \hat{x}^c)) \quad \text{Expression 12:}$$

In Expression 12, $x^i$ denotes the input embedding vector 810, and $\{x_i^c\}_{i=1,\ldots,N}$ denotes the enrollment embedding vectors 820 included in the embedding cluster. The combination embedding vector may be represented by $\hat{x}^c = f(x_1^c, x_2^c, \ldots, x_N^c)$. $S(x,y)$ denotes a similarity between embedding vectors x and y. $L(S(\cdot,\cdot))$ denotes a loss function related to a similarity.

In an example, an appropriate similarity between the input embedding vector 810 and the enrollment embedding vectors 820 included in the embedding cluster may be obtained by finding the adaptive embedding vector 830 properly combined through a definition of a combination function f and a loss function L between the input embedding vector $x^i$ 210 and the combination embedding vector $\hat{x}^c$ combined in the embedding cluster as shown in Expression 12.

Figure 8B:
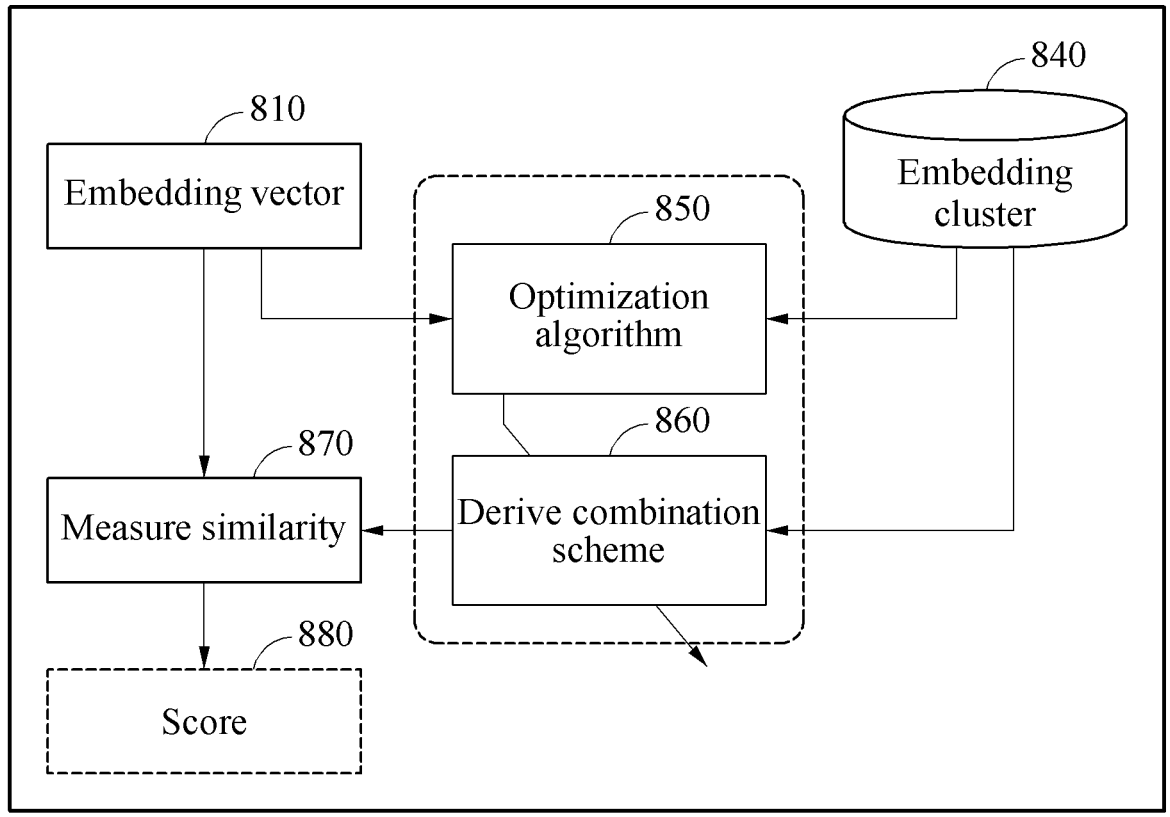
FIG. 8B illustrates an example of a method of classifying input data.

FIG. 8B illustrates an example of a method of classifying input data.

FIG. 8B illustrates a process in which a classification apparatus measures a similarity between an input embedding vector 810 and each of enrollment embedding vectors included in an embedding cluster 840.

The classification apparatus may extract the input embedding vector 810 for input data using, for example, a DNN. The classification apparatus may use the input embedding vector 810 as an argument of an optimization algorithm 850 for optimizing a similarity measurement and a combination scheme. In this example, since the optimization algorithm 850 combines an embedding vector adaptive to an input embedding vector, the optimization algorithm 850 may also be referred to as an "adaptive algorithm."

The classification apparatus may convert enrollment data included in the embedding cluster 840 into enrollment embedding vectors, using the DNN. The enrollment embedding vectors may also be used as arguments of the optimization algorithm 850 and a combination scheme.

The classification apparatus may apply the optimization algorithm 850 to the input embedding vector 810 and the enrollment embedding vectors in the embedding cluster 840, and may derive an optimal combination scheme according to a result of applying the optimization algorithm 850 in operation 860. The classification apparatus may generate a combination embedding vector that may prevent an error from occurring in similarity calculation through a combination of embedding vectors that are clustered adaptively to an input embedding vector.

In operation 870, the classification apparatus may measure a similarity between the input embedding vector 810 and a combination embedding vector determined according to the derived optimal combination scheme. The classification apparatus may use the measured similarity without a change, or may convert the measured similarity into the form of a similarity score 880 and may use the similarity score 880.

In an example, the DNN may include a large number of artificial neurons connected by line-shaped edges. An artificial neuron may be referred to as a node. Artificial neurons may be interconnected through edges having connection weights. A connection weight may be a predetermined value of edges, and may be referred to as a "synaptic weight" or a "connection intensity". The DNN may include, for example, an input layer, a hidden layer, and an output layer. Each of the input layer, the hidden layer, and the output layer may include a plurality of nodes. A node included in the input layer may be referred to as an "input node", a node included in the hidden layer may be referred to as a "hidden node", and a node included in the output layer may be referred to as an "output node".

The input layer may receive an input for performing training or recognition and may transmit the input to the hidden layer. The output layer may generate an output of the DNN based on a signal received from the hidden layer. The hidden layer may be located between the input layer and the output layer, and may change a training input of training data received via the input layer to a value that is relatively easily predictable. Input nodes included in the input layer and hidden nodes included in the hidden layer may be connected to each other via connection lines having connection weights. Hidden nodes included in the hidden layer and output nodes included in the output layer may be connected to each other via connection lines having connection weights.

The classification apparatus may input outputs of previous hidden nodes included in a previous hidden layer to a corresponding hidden layer through connection lines having connection weights. The classification apparatus may generate outputs of hidden nodes included in the hidden layer, based on an activation function and values obtained by applying connection weights to outputs of previous hidden nodes. In an example, when a result of the activation function exceeds a threshold of a current hidden node, an output may be transmitted to a next hidden node. In this example, the current hidden node may remain in an inactive state, instead of transmitting a signal to the next hidden node until reaching a predetermined threshold activation strength through input vectors.

The classification apparatus may train the DNN through supervised learning. The classification apparatus may be implemented by, for example, a hardware module, or a combination thereof. The supervised learning may be a scheme of inputting, to the DNN, a training input of training data together with a training output corresponding to the training input and of updating connection weights of connection lines so that output data corresponding to the training output may be output. The training data may be data including a pair of a training input and a training output.

Figure 9:
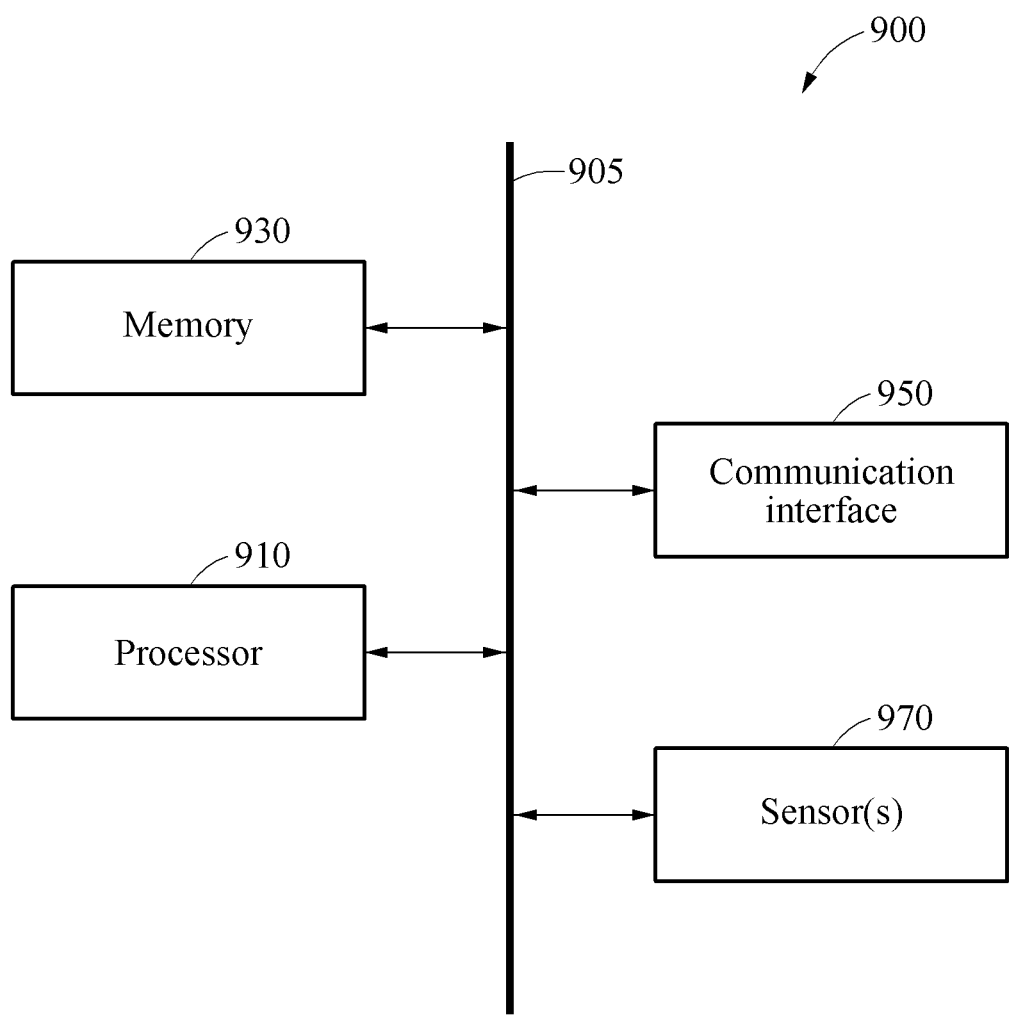
FIG. 9 illustrates an example of an anti-spoofing apparatus.

FIG. 9 illustrates an example of an anti-spoofing apparatus.

Referring to FIG. 9, an anti-spoofing apparatus 900 includes a processor 910. The anti-spoofing apparatus 900 may further include a memory 930, a communication interface 950, and sensors 970. The processor 910, the memory 930, the communication interface 950, and the sensors 970 may communicate with each other via a communication bus 905.

The processor 910 may extract an input embedding vector corresponding to input biometric information, may obtain a fake embedding vector of a fake model provided in advance, and may obtain a real embedding vector of a real model provided in advance and/or an enrollment embedding vector of an enrollment model, may determine a confidence value of the input embedding vector based on the fake embedding vector, and either one or both of the real embedding vector and the enrollment embedding vector, and may determine whether the input biometric information is forged.

The processor 910 may extract an input embedding vector including a feature of biometric information of a user from input data including the biometric information, may detect first information regarding whether the biometric information is forged, based on a first output vector of a first neural network configured to detect whether the biometric information is forged from the input data, and may calculate a similarity value of the input embedding vector based on a fake embedding vector and either one or both of a real embedding vector and an enrollment embedding vector that are provided in advance. Also, the processor 910 may calculate a total forgery score based on the similarity value and a second output vector of the first neural network according to whether the first information is detected, and may detect second information regarding whether the biometric information is forged based on the total forgery score.

The memory 930 may include a DB configured to store an enrollment model, a real model, and/or a fake model. The memory 930 may store pre-trained parameters of a neural network. The sensors 970 may be devices for sensing biometric information of a user, and may include, for example, a fingerprint sensor for sensing a fingerprint of a user.

The processor 910 may estimate a posterior probability between the input embedding vector and any one or any combination of the real embedding vector, the fake embedding vector, and the enrollment embedding vector, and may determine a confidence value of the input embedding vector based on the posterior probability.

The processor 910 may perform the method or algorithm described above with reference to FIGS. 2 to 8B. The processor 910 may execute a program and control the anti-spoofing apparatus 900. Program codes to be executed by the processor 910 may be stored in the memory 930. The anti-spoofing apparatus 900 may be connected to an external device (for example, a PC or a network) through an input/output device (not shown) to exchange data with the external device. The anti-spoofing apparatus 900 may be mounted on various computing devices and/or systems such as a smartphone, a tablet computer, a laptop computer, a desktop computer, a TV, a wearable device, a security system, or a smart home system.

The anti-spoofing apparatus and other devices, apparatuses, units, modules, and components described herein with respect to FIGS. 1, 3A, 4A-4C, 6A, 6B, 7A-7D, and 8B are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 and 3B, for example, that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An anti-spoofing method comprising:
    detecting first information related to whether biometric information of a user is forged, based on a first output vector of a first neural network configured to detect whether the biometric information is forged from input data comprising the biometric information;
    extracting an input embedding vector comprising a feature of the biometric information from the input data;
    calculating a similarity value of the input embedding vector based on a result of comparing the input embedding vector with a fake embedding vector and a result of comparing the input embedding vector with one or both of a real embedding vector and an enrollment embedding vector, the real embedding vector and the enrollment embedding vector being provided in advance;
    calculating a total forgery score based on the similarity value and a second output vector of the first neural network according to whether the first information is detected; and
    detecting second information related to whether the biometric information is forged, based on the total forgery score,
    wherein the detecting the first information comprises:
    extracting the first output vector from an intermediate layer of the first neural network; and
    calculating an intermediate forgery score based on the first output vector.

2. The method of claim 1, wherein detecting the first information comprises:
determining whether the intermediate forgery score is in a threshold range for detection of the first information; and
detecting the first information based on the intermediate forgery score, in response to determining that the intermediate forgery score is in the threshold range.

3. The method of claim 1, wherein calculating the total forgery score comprises, in response to the first information not being detected, calculating the total forgery score based on the second output vector and the similarity value.

4. The method of claim 1, wherein calculating the total forgery score comprises:
in response to the first information not being detected, calculating a final forgery score based on the second output vector, which is output from an output layer of the first neural network; and
calculating the total forgery score based on the final forgery score and the similarity value.

5. The method of claim 4, wherein calculating the total forgery score comprises:
performing a weighted summation of the final forgery score and the similarity value; and
calculating the total forgery score by applying a nonlinear function to a result of the weighted summation.

6. The method of claim 1, wherein detecting the second information comprises detecting the second information by comparing the total forgery score to a first threshold for detection of the second information.

7. The method of claim 6, further comprising:
determining whether an embedding vector update condition of the input embedding vector is satisfied based on the total forgery score; and
updating any one or any combination of the enrollment embedding vector, the real embedding vector, and the fake embedding vector, using the input embedding vector based on a determination that the embedding vector update condition is satisfied.

8. The method of claim 1, further comprising:
generating a virtual enrollment embedding vector having an environmental characteristic different from an environmental characteristic of the enrollment embedding vector and having a structural characteristic of the enrollment embedding vector,
wherein calculating the similarity value comprises calculating the similarity value based on the fake embedding vector and any one or any combination of the enrollment embedding vector, the real embedding vector, and the virtual enrollment embedding vector.

9. The method of claim 1, further comprising:
calculating the similarity value based on a posterior probability between the input embedding vector and any one or any combination of the real embedding vector, the enrollment embedding vector, and the fake embedding vector, and
calculating the posterior probability based on a distance or a similarity between the input embedding vector and the any one or any combination of the real embedding vector, the enrollment embedding vector, and the fake embedding vector.

10. The method of claim 1, wherein calculating the similarity value comprises:
determining a value of a first category corresponding to a case in which the biometric information is not forged, based on a first distance between the real embedding vector and the input embedding vector and a third distance between the enrollment embedding vector and the input embedding vector;
determining a value of a second category corresponding to a case in which the biometric information is forged, based on a second distance between the fake embedding vector and the input embedding vector; and
determining a confidence value of the input embedding vector based on the value of the first category and the value of the second category.

11. The method of claim 1, wherein
extracting the input embedding vector comprises extracting the input embedding vector from the biometric information using the first neural network, and
the first neural network is trained based on live biometric information and spoof biometric information.

12. A non-transitory computer-readable storage medium storing instructions that, when executed by a processor, cause the processor to perform the method of claim 1.

13. An anti-spoofing apparatus comprising:
a processor configured to:
detect first information related to whether biometric information of a user is forged, based on a first output vector of a first neural network configured to detect whether the biometric information is forged from input data comprising the biometric information;
extract an input embedding vector comprising a feature of the biometric information from the input data;
calculate a similarity value of the input embedding vector based on a result of comparing the input embedding vector with a fake embedding vector and a result of comparing the input embedding vector with either one or both of a real embedding vector and an enrollment embedding vector, the real embedding vector and the enrollment embedding vector being provided in advance;
calculate a total forgery score based on the similarity value and a second output vector of the first neural network according to whether the first information is detected; and
detect second information related to whether the biometric information is forged, based on the total forgery score,
wherein the processor is configured to:
extract the first output vector from an intermediate layer of the first neural network; and
calculate an intermediate forgery score based on the first output vector.

14. The apparatus of claim 13 wherein the processor is configured to: determine whether the intermediate forgery score is in a threshold range for detection of the first information; and detect the first information based on the intermediate forgery score, in response to determining that the intermediate forgery score is in the threshold range.

15. The apparatus of claim 13, wherein the processor is configured to, in response to the first information not being detected, calculate the total forgery score based on the second output vector and the similarity value.

16. The apparatus of claim 13, wherein the processor is configured to:
in response to the first information not being detected, calculate a final forgery score based on the second output vector, which output from an output layer of the first neural network; and
calculate the total forgery score based on the final forgery score and the similarity value.

17. The apparatus of claim 16, wherein the processor is configured to:

perform a weighted summation of the final forgery score and the similarity value; and calculate the total forgery score by applying a nonlinear function to a result of the weighted summation.

18. The apparatus of claim 13, wherein the processor is configured to detect the second information by comparing the total forgery score to a first threshold for detection of the second information.

19. The apparatus of claim 18, wherein the processor is configured to:
determine whether an embedding vector update condition of the input embedding vector is satisfied based on the total forgery score; and
update any one or any combination of the enrollment embedding vector, the real embedding vector, and the fake embedding vector, using the input embedding vector based on a determination that the embedding vector update condition is satisfied.

20. The apparatus of claim 13, wherein the processor is configured to:
generate a virtual enrollment embedding vector having an environmental characteristic different from an environmental characteristic of the enrollment embedding vector and having a structural characteristic of the enrollment embedding vector; and
calculate the similarity value based on the fake embedding vector and any one or any combination of the enrollment embedding vector, the real embedding vector, and the virtual enrollment embedding vector.

21. The apparatus of claim 13, wherein the processor is configured to:
calculate the similarity value based on a posterior probability between the input embedding vector and any one or any combination of the real embedding vector, the enrollment embedding vector, and the fake embedding vector, and
calculate the posterior probability based on a distance or a similarity between the input embedding vector and the any one or any combination of the real embedding vector, the enrollment embedding vector, and the fake embedding vector.

22. The apparatus of claim 13, wherein the processor is configured to:
determine a value of a first category corresponding to a case in which the biometric information is not forged, based on a first distance between the real embedding vector and the input embedding vector and a third distance between the enrollment embedding vector and the input embedding vector;
determine a value of a second category corresponding to a case in which the biometric information is forged, based on a second distance between the fake embedding vector and the input embedding vector; and
determine a confidence value of the input embedding vector based on the value of the first category and the value of the second category.

23. The apparatus of claim 13, wherein
the processor is configured to extract the input embedding vector from the biometric information using the first neural network, and
the first neural network is trained based on live biometric information and spoof biometric information.

24. An apparatus comprising:
one or more processors configured to:
extract an input embedding vector comprising a feature of biometric information included in input data;
calculate a similarity value of the input embedding vector based on a result of comparing the input embedding vector with a fake embedding vector and a result of comparing the input embedding vector with one or both of a real embedding vector and an enrollment embedding vector;
calculate a total forgery score based on the similarity value and a first output vector of a neural network, which is trained using live biometric information and spoof biometric information; and
determine whether the biometric information is forged based on the total forgery score,
wherein the one or more processors are configured to:
extract a second output vector from an intermediate layer of the neural network; and
calculate an intermediate forgery score based on the second output vector.

25. The apparatus of claim 24, wherein the one or more processors are configured to:
determine that the biometric information is live information in a case in which the total forgery score is greater than a first threshold; and
determine that biometric information is spoof information in a case in which the total forgery score is less than or equal to the first threshold.

26. The apparatus of claim 25, wherein the one or more processors are configured to
determine the first threshold based on a reject threshold corresponding to a maximum probability that an intermediate forgery score based on the output vector is determined to fall within a range in which the biometric information is determined as spoof information, and based on an accept threshold corresponding to a minimum probability that the intermediate forgery score is determined to fall within a range in which the biometric information is determined as live information.

* * * * *